(12) United States Patent
Wu et al.

(10) Patent No.: US 8,547,857 B2
(45) Date of Patent: *Oct. 1, 2013

(54) OPPORTUNISTIC UPLINK SCHEDULING

(75) Inventors: Xinzhou Wu, Monmouth Junction, NJ (US); Sundeep Rangan, Jersey City, NJ (US); Prashanth Hande, Somerset, NJ (US); Arnab Das, Summit, NJ (US); Junyi Li, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1163 days.

This patent is subject to a terminal disclaimer.

(21) Appl. No.: 11/943,489

(22) Filed: Nov. 20, 2007

(65) Prior Publication Data

US 2009/0129331 A1 May 21, 2009

(51) Int. Cl.
| H04W 72/00 | (2009.01) |
| H04W 4/00 | (2009.01) |
| H04W 24/00 | (2009.01) |
| H04L 12/26 | (2006.01) |
| H04B 15/00 | (2006.01) |

(52) U.S. Cl.
USPC ........... 370/252; 370/328; 370/330; 370/436; 455/63.1; 455/67.11; 455/452.2

(58) Field of Classification Search
USPC .......................... 370/330, 310, 328, 339, 348
See application file for complete search history.

(56) References Cited

U.S. PATENT DOCUMENTS

| 6,411,817 | B1 | 6/2002 | Cheng et al. |
| 6,529,494 | B1 | 3/2003 | Ostman et al. |
| 6,564,067 | B1 | 5/2003 | Agin |
| 6,628,924 | B1 | 9/2003 | Miyamoto |
| 6,628,929 | B1 | 9/2003 | Nomura |
| 6,711,149 | B1 | 3/2004 | Yano et al. |
| 6,748,234 | B1 | 6/2004 | Agrawal et al. |

(Continued)

FOREIGN PATENT DOCUMENTS

| CN | 1154614 A | 7/1997 |
| CN | 1371219 A | 9/2002 |

(Continued)

OTHER PUBLICATIONS

International Search Report and Written Opinion -PCT/US2008/084180, International Search Authority—European Patent Office—May 3, 2009.

(Continued)

*Primary Examiner* — Alpus H Hsu
(74) *Attorney, Agent, or Firm* — Donald C. Kordich

(57) ABSTRACT

Systems and methodologies are described that facilitate scheduling uplink transmissions. For instance, a time sharing scheme can be utilized such that differing mobile devices can be scheduled to transmit during differing time slots; however, it is also contemplated that a static scheme can be employed. Pursuant to an illustration, an interference budget can be combined with a time varying weighting factor associated with a base station; the weighting factor can be predefined and/or adaptively adjusted (e.g., based upon a load balancing mechanism). Moreover, the weighted interference budget can be leveraged for selecting mobile devices for uplink transmission (e.g., based at least in part upon path loss ratios of the mobile devices). Further, disparate interference budgets can be utilized by differing channels of a sector at a particular time. Also, for example, a base station can assign a loading factor to be utilized by wireless terminal(s) for generating channel quality report(s).

25 Claims, 26 Drawing Sheets

(56) References Cited

U.S. PATENT DOCUMENTS

| | | | |
|---|---|---|---|
| 6,873,613 B1 | 3/2005 | Dent | |
| 7,065,051 B2 | 6/2006 | Airy et al. | |
| 7,257,376 B2 | 8/2007 | Reudink | |
| 7,336,956 B2 | 2/2008 | Halonen et al. | |
| 7,602,722 B2 | 10/2009 | Chheda | |
| 7,613,233 B2 | 11/2009 | Hottinen | |
| 7,623,884 B2 | 11/2009 | Moon et al. | |
| 8,055,198 B2* | 11/2011 | Benes et al. | 455/63.1 |
| 8,107,885 B2* | 1/2012 | Love et al. | 455/67.11 |
| 2002/0063656 A1 | 5/2002 | Gutowski | |
| 2002/0105921 A1 | 8/2002 | Sawyer et al. | |
| 2004/0014425 A1 | 1/2004 | Unno | |
| 2004/0072571 A1* | 4/2004 | Halonen et al. | 455/450 |
| 2004/0106412 A1 | 6/2004 | Laroia et al. | |
| 2004/0136345 A1 | 7/2004 | Yano et al. | |
| 2005/0237959 A1 | 10/2005 | Osterloh et al. | |
| 2006/0009250 A1 | 1/2006 | Lee et al. | |
| 2006/0073791 A1 | 4/2006 | Senarath et al. | |
| 2007/0032196 A1 | 2/2007 | Dominique et al. | |
| 2007/0054619 A1 | 3/2007 | Kinnunen et al. | |
| 2007/0087772 A1 | 4/2007 | Yi et al. | |
| 2007/0178930 A1 | 8/2007 | Xiao et al. | |
| 2007/0248178 A1* | 10/2007 | Zhu et al. | 375/260 |
| 2008/0070585 A1 | 3/2008 | Wu et al. | |
| 2008/0081655 A1 | 4/2008 | Shin et al. | |
| 2008/0123602 A1 | 5/2008 | Beek et al. | |
| 2008/0146241 A1* | 6/2008 | Das et al. | 455/450 |
| 2008/0188256 A1 | 8/2008 | Wu et al. | |
| 2008/0214193 A1 | 9/2008 | Jeong et al. | |
| 2008/0233967 A1* | 9/2008 | Montojo et al. | 455/452.2 |
| 2009/0109907 A1* | 4/2009 | Tsai et al. | 370/329 |
| 2009/0129345 A1 | 5/2009 | Wu et al. | |
| 2009/0131068 A1 | 5/2009 | Wu et al. | |
| 2009/0131069 A1 | 5/2009 | Wu et al. | |
| 2009/0205709 A1 | 8/2009 | Kim | |
| 2009/0305709 A1 | 12/2009 | Panico et al. | |
| 2010/0128504 A1 | 5/2010 | Lee et al. | |
| 2010/0136989 A1* | 6/2010 | Westerberg et al. | 455/450 |
| 2010/0209903 A1 | 8/2010 | Telles et al. | |
| 2010/0309903 A1 | 12/2010 | Bevan et al. | |
| 2011/0310879 A1 | 12/2011 | Wu et al. | |

FOREIGN PATENT DOCUMENTS

| | | | |
|---|---|---|---|
| CN | 1481650 A | | 3/2004 |
| CN | 1925361 A | | 3/2007 |
| EP | 767548 A2 | * | 4/1997 |
| EP | 1119113 A2 | | 7/2001 |
| EP | 1231807 | | 8/2002 |
| EP | 1231807 A2 | | 8/2002 |
| EP | 1248480 A2 | | 10/2002 |
| EP | 1965509 A1 | | 9/2008 |
| JP | 2001244881 A | | 9/2001 |
| JP | 2004527166 | | 9/2004 |
| JP | 2007511943 A | | 5/2007 |
| KR | 1020050105286 A | | 11/2005 |
| KR | 20070041214 A | | 4/2007 |
| WO | WO0072617 A1 | | 11/2000 |
| WO | WO0122599 A2 | | 3/2001 |
| WO | WO0232011 A1 | | 4/2002 |
| WO | WO02073831 A1 | | 9/2002 |
| WO | WO2004088899 A2 | | 10/2004 |
| WO | WO2006077450 | | 7/2006 |
| WO | WO2007047502 A1 | | 4/2007 |
| WO | WO2007047503 | | 4/2007 |
| WO | WO2007072822 | | 6/2007 |
| WO | WO2007117468 | | 10/2007 |
| WO | WO2008076940 | | 6/2008 |
| WO | WO2005053183 A1 | | 6/2009 |

OTHER PUBLICATIONS

International Search Report and Written Opinion—PCT/US2008/084180, International Search Authority—European Patent Office—May 3, 2009.

Hande et al., "Distributed Uplink Power Control for Optimal SIR Assignment in Cellular Data Networks", pp. 1-14 IEEE Infocom 2006, Barcelona, Spain, (2006).

Taiwan Search Report—TW097144973—TIPO—Dec. 22, 2011.

* cited by examiner

OPPORTUNISTIC UPLINK SCHEDULING

CROSS-REFERENCE TO RELATED APPLICATIONS

This application is related to co-pending U.S. patent application Ser. No. 11/943,504 entitled "OPPORTUNISTIC UPLINK SCHEDULING", co-pending U.S. patent application Ser. No. 11/943,512, entitled "OPPORTUNISTIC UPLINK SCHEDULING", and co-pending U.S. patent application Ser. No. 11,943,517 entitled "OPPORTUNISTIC UPLINK SCHEDULING", which were each filed on the same day as the subject application.

BACKGROUND

I. Field

The following description relates generally to wireless communications, and more particularly to uplink scheduling in wireless communication systems.

II. Background

Wireless communication systems are widely deployed to provide various types of communication; for instance, voice and/or data can be provided via such wireless communication systems. A typical wireless communication system, or network, can provide multiple users access to one or more shared resources. For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream can be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes schedule downlink and uplink transmissions. As an example, base stations commonly assign channels, times, frequencies, and so forth for mobile devices to utilize for communicating over the uplink. Conventional uplink scheduling schemes are typically based upon power control algorithms. The goal of such algorithms can be to achieve sustainable transmit rates for all users in the system. For CDMA systems, the targeted rates for different users can usually be chosen to be substantially similar to one another; thus, the transmit power of each mobile device can be controlled such that the received signal-to-interference-and-noise ratio (SINR) exceeds a certain threshold. Such strategy can be more beneficial for utilization with voice-user oriented networks. For data networks, a framework that extends the power control algorithms to a more general rate-control framework can be employed where each user can target a different rate as long as the rate-vector is within a capacity region. Under this algorithm, the system can converge to a rate vector within the capacity region that can maximize a given utility function. However, the targeted rate vector remains sustainable in that every user transmits at every time and the algorithm leads to an equilibrium where every mobile transmits at a certain rate. Due to the existence of inter and intra cell interference, sustainable rates can introduce inefficiencies since such sustainable rates may not be the optimal achievable rates for the users.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating scheduling of uplink transmissions. For instance, a time sharing scheme can be utilized such that differing mobile devices can be scheduled to transmit during differing time slots; however, it is also contemplated that a static scheme can be employed. Pursuant to an illustration, an interference budget can be combined with a time varying weighting factor associated with a base station; the weighting factor can be predefined and/or adaptively adjusted (e.g., based upon a load balancing mechanism). Moreover, the weighted interference budget can be leveraged for selecting mobile devices for uplink transmission (e.g., based at least in part upon path loss ratios of the mobile devices). By way of a further illustration, disparate interference budgets can be utilized for differing channels of a sector at a particular time, and the disparate interference budgets can be employed for uplink scheduling upon the respective channels. According to another example, a base station can assign a loading factor to be utilized by wireless terminal(s) for generating channel quality report(s) (e.g., the loading factor is leveraged by wireless terminal(s) to determine path loss ratio(s)). The assigned loading factor can be static or dynamic. Further, the base station can obtain the channel quality report(s) and thereafter select mobile devices for uplink transmission.

According to related aspects, a method that facilitates scheduling uplink transmissions in a communication network including a first base station that includes a first sector utilizing a static interference budget with multi-carriers is described herein. The method can include receiving channel quality reports from one or more mobile device. Further, the method can comprise scheduling a first mobile device for uplink transmission from a first sector on a first channel during a first time slot based on a first interference budget level, the first channel includes a first frequency bandwidth. Moreover, the method can include scheduling a second mobile device for uplink transmission from the first sector on a second channel during the first time slot based on a second interference budget level, the second channel includes a second frequency bandwidth and the first and second interference budgets differ by at least 0.5 dB. Additionally, the method can include transmitting assignments to the first mobile device and the second mobile device related to the scheduled uplink transmissions.

Another aspect relates to a wireless communications apparatus. The wireless communications apparatus can include a memory that retains instructions related to scheduling a first mobile device for uplink transmission from a first sector on a first channel during a first time slot based on a first interference budget level, scheduling a second mobile device for uplink transmission from the first sector on a second channel during the first time slot based on a second interference budget level, and transmitting assignments to the first mobile device and the second mobile device related to the scheduled uplink transmissions, the first channel includes a first frequency bandwidth, the second channel includes a second frequency bandwidth that is non-overlapping with the first frequency bandwidth, and the first and second interference budgets differ by at least 0.5 dB. Further, the wireless communications apparatus can include a processor, coupled to the memory, configured to execute the instructions retained in the memory.

Yet another aspect relates to a wireless communications apparatus that enables scheduling uplink transmissions by utilizing a static interference budget in a multi-carrier environment. The wireless communications apparatus can include means for scheduling a first mobile device for uplink transmission from a first sector on a first channel during a first time slot based on a first interference budget level. Further, the wireless communications apparatus can comprise means for scheduling a second mobile device for uplink transmission from the first sector on a second channel during the first time slot based on a second interference budget level, the first and second interference budget levels differ by at least 0.5 dB. Moreover, the wireless communications apparatus can include means for sending assignments related to the uplink transmissions to the scheduled mobile devices.

Still another aspect relates to a machine-readable medium having stored thereon machine-executable instructions for scheduling a first mobile device for uplink transmission from a first sector on a first channel during a first time slot based on a first interference budget level, the first channel includes a first frequency bandwidth; and scheduling a second mobile device for uplink transmission from the first sector on a second channel during the first time slot based on a second interference budget level, the second channel includes a second frequency bandwidth that is non-overlapping with the first frequency bandwidth and the first and second interference budget levels differ by at least 0.5 dB.

In accordance with another aspect, an apparatus in a wireless communication system can include a processor, wherein the processor can be configured to schedule a first mobile device for uplink transmission from a first sector on a first channel during a first time slot based on a first interference budget level, the first channel includes a first frequency bandwidth. Further, the processor can be configured to schedule a second mobile device for uplink transmission from the first sector on a second channel during the first time slot based on a second interference budget level, the second channel includes a second frequency bandwidth that is non-overlapping with the first frequency bandwidth and the first and second interference budget levels differ by at least 0.5 dB.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
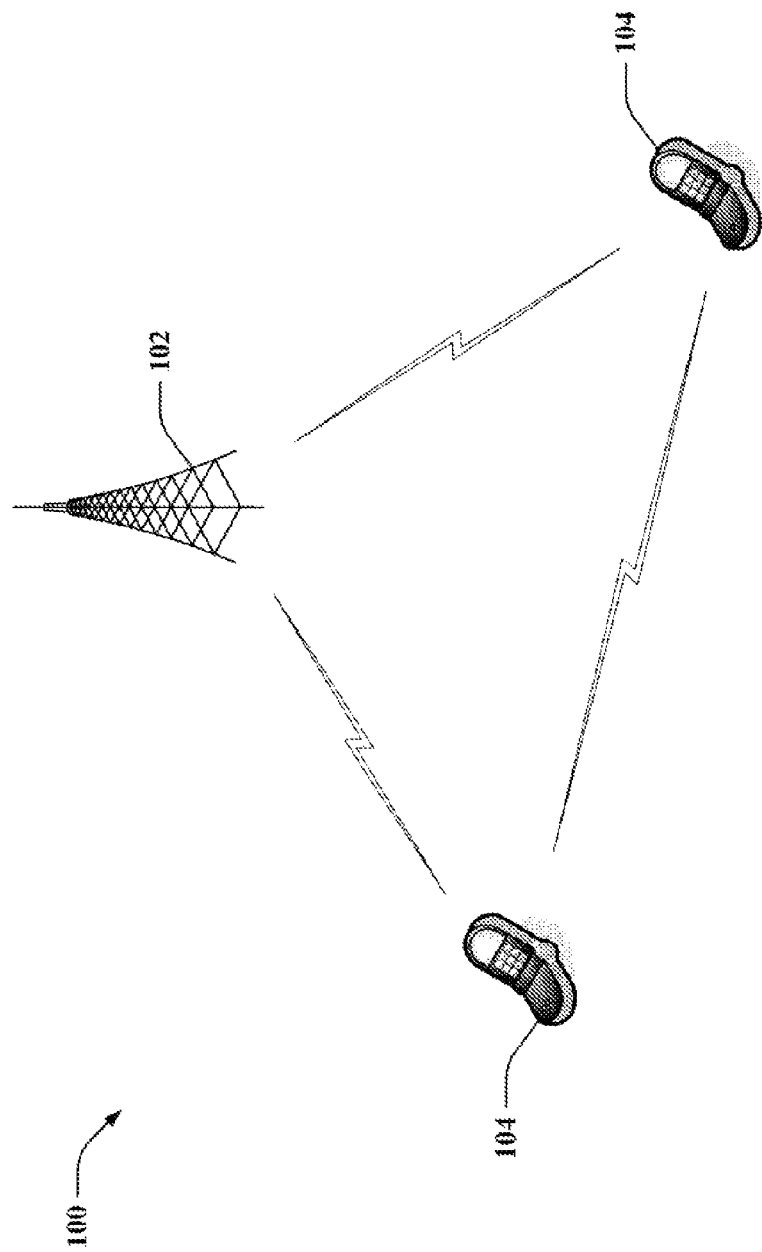
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a wireless terminal. A wireless terminal can also be called a system, subscriber unit, subscriber station, mobile station, mobile, mobile device, remote station, remote terminal, access terminal, user terminal, terminal, wireless communication device, user agent, user device, or user equipment (UE). A wireless terminal may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with wireless terminal(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 can comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100. Base stations 102 can each communicate with one or more mobile devices 104. Base stations 102 can transmit information to mobile devices 104 over a forward link (downlink) and receive information from mobile devices 104 over a reverse link (uplink).

System 100 can support differing types of users such as close-to-base station users (e.g., one or more mobile devices 104) and cell-boundary users (e.g., one or more mobile devices 104). For example, inter-cell interference (e.g., interference generated by a mobile device at non-serving base station(s)) yielded by a mobile device 104 can be similar to signal strength observed at a serving base station when cell-boundary users transmit upon the uplink. Further, close-to-base station users can generate a lesser amount of inter-cell interference.

Moreover, system 100 can enable time sharing between mobile devices 104; thus, different mobile devices 104 can transmit on the uplink during differing time slots. Time sharing can be effectuated by base station 102 scheduling uplink transmission, for instance. Base station 102 can utilize an interference budget in connection with uplink scheduling. Further, the interference budget can be time varying (or weighted by a time varying factor). Additionally, the interference budget can be a function of an identity of a cell (e.g., interference budgets can differ between cells during a particular time slot). Pursuant to another illustration, the interference budget can vary between sectors. Uplink scheduling can be effectuated such that when the interference budget is good, cell-boundary users can be scheduled, and when the interference budget is bad, the close-to-base station users can be scheduled. According to another example, base station 102 can provide a loading factor to be employed by mobile devices 104 for generating channel quality reports. The loading factor can be dynamic (e.g., time varying) or static (e.g., each sector and/or cell can employ a respective loading factor that need not change as a function of time). Thereafter, base station 102 can obtain the channel quality reports and schedule uplink transmission based upon such reports.

Accordingly, the scheme employed in connection with system 100 can provide benefits by mitigating interference seen by cell-boundary users as compared to an amount of inter-cell interference commonly observed with cell-boundary users in conventional systems that leverage power-control based algorithms. Additionally, close-to-base station users can be scheduled with higher transmit power to compensate for higher interference observed while utilizing the time varying interference budget based scheme as compared to power-control based schemes since the users need not be power limited. Further, close-to-base station users can be scheduled more frequently when employing the time varying interference budget based scheme supported by system 100.

Figure 2:
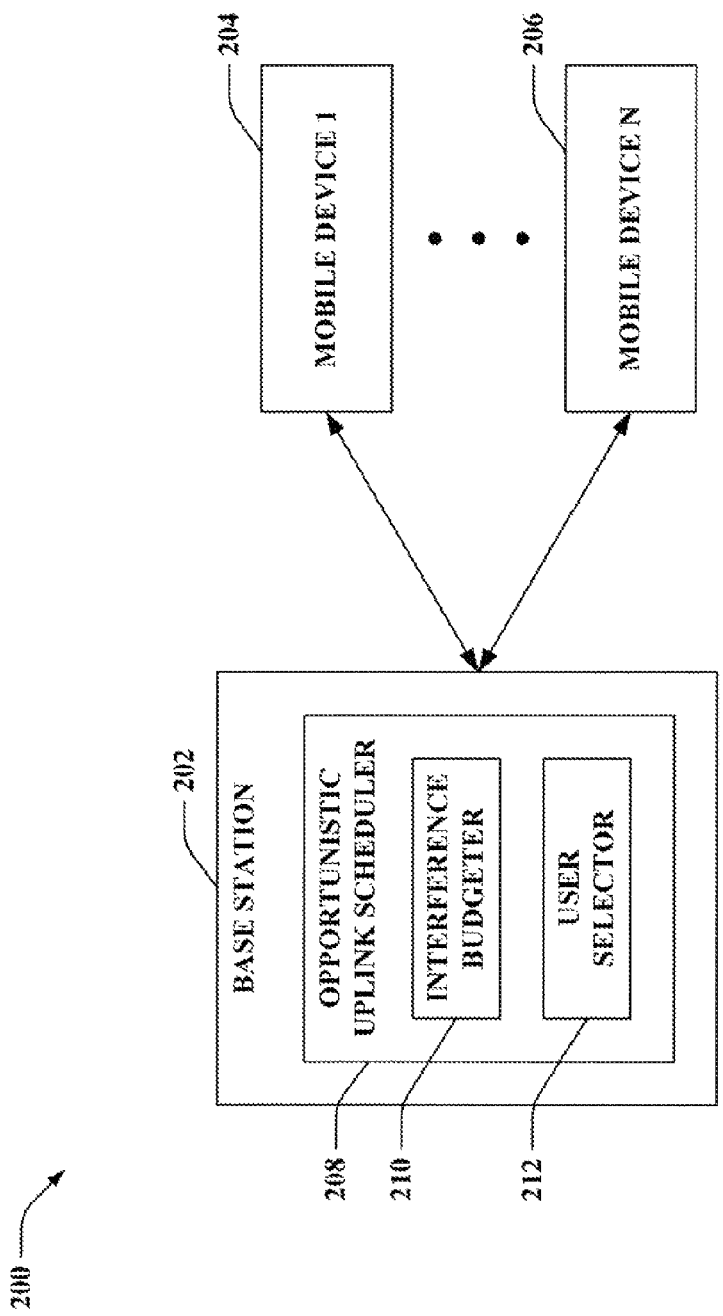
FIG. 2 is an illustration of an example system that schedules uplink transmissions based at least in part upon an interference budget.

Turning to FIG. 2, illustrated is a system 200 that schedules uplink transmissions based at least in part upon an interference budget. For instance, the interference budget can be dynamic (e.g., time varying) or static. According to another example, differing interference budgets can be utilized for scheduling uplink transmission upon disparate uplink channels; these differing interference budgets can be dynamic and/or static. System 200 includes a base station 202 that can serve one or more mobile devices (e.g., mobile device 1 204, . . . , mobile device N 206, where N can be substantially any integer); accordingly, links can be established between base station 202 and mobile devices 204-206. Each mobile device 204-206 can communicate with base station 202 (and/or disparate base station(s)) on downlink and/or uplink channel(s) at any given moment. The downlink refers to the communication link from base station 202 to mobile devices 204-206, and the uplink channel refers to the communication link from mobile devices 204-206 to base station 202. Base station 202 can further communicate with other base station(s) and/or any disparate devices (e.g., servers) (not shown) that can perform functions such as, for example, authentication and authorization of mobile devices 204-206, accounting, billing, and so forth.

Base station 202 can include an opportunistic uplink scheduler 208 that generates assignments for uplink transmissions from mobile devices 204-206 to base station 202. Opportunistic uplink scheduler 208 can allocate resources to be utilized by mobile devices 204-206. For example, at a particular time, opportunistic uplink scheduler 208 can allot an uplink channel (and/or a plurality of uplink channels) to be utilized by a particular mobile device (e.g., mobile device 1 204, . . . ); meanwhile, a disparate mobile device (e.g., mobile device N 206, . . . ) can be scheduled by opportunistic uplink scheduler 208 at a differing time (however, the claimed subject matter is not so limited). Opportunistic uplink scheduler 208 can transfer assignments to respective mobile devices 204-206, for example. It is contemplated that the assignments yielded by opportunistic uplink scheduler 208 can provide information related to time (e.g., time slot, duration, . . . ), channel, frequency (e.g., tone(s)), power level, rate, and the like to be employed for uplink communication.

Opportunistic uplink scheduler 208 can include an interference budgeter 210 and a user selector 212. Opportunistic uplink scheduler 208 can employ a scheme that leverages the non-convexity nature of a sustainable rate region. For instance, rates can be assigned by opportunistic uplink scheduler 208 according to the following criterion:

$$\sum_{i:c(i)=k} N_i \alpha_i \gamma_i \le l_k w_k$$

where $N_i$ is the number of tones used by user i, $\alpha_i$ is the spillage (or path loss ratio) and $\gamma_i$ is the targeted SNR of user i. Additionally, $l_k w_k$ is the weighted interference budget of cell k (e.g., $l_k$ is the interference budget of cell k and $w_k$ is the weighting of cell k). The interference budget sets forth a total interference level not to be exceeded by user(s) employing uplink channel(s) associated with a particular cell (and/or sector). Further, the interference budget is leveraged by opportunistic uplink scheduler 208 when selecting user(s) to schedule for uplink transmission. Interference budgeter 210 can vary the weighted interference budget across time. For instance, interference budgeter 210 can employ a time variation curve that can weight the interference budget. Following this illustration, the time variation curve can be predefined and/or adaptive according to a load balancing mechanism. By way of example, $l_k$'s can be weighted by interference budgeter 210 in a manner such that a good interference budget can be yielded when neighboring cell(s) have relatively bad interference budgets. Thus, interference budgeters of disparate base stations (not shown) similar to interference budgeter 210 can enable a plurality of cells to coordinate time variation of the respective interference budgets associated with each of the cells; hence, the interference budgets of the plurality of cells can complement one another over time.

Moreover, user selector 212 can schedule particular mobile devices 204-206 for uplink transmission based upon the time varying interference budget yielded by interference budgeter 210. User selector 212 can choose a particular mobile device (e.g., mobile device 1 204, . . . ) from amongst the set of mobile devices 204-206 to assign to an uplink traffic channel during a time slot as a function of the time varying interference budget. User selector 212 can schedule cell-boundary users (e.g., mobile device(s) 204-206 located further from base station 202) when the interference budget is good and close-to-base station users (e.g., mobile device(s) 204-206 located proximate to the base station 202) when the interference budget is bad. Hence, cell-boundary users can experience decreased interference as compared to similar users employing power-control based algorithms since such users in disparate cells can be scheduled at differing times for uplink transmission.

According to another example, interference budgeter 210 can allocate a first interference budget for uplink scheduling upon a first channel and a second interference budget for uplink scheduling upon a second channel. For instance, the first interference budget and the second interference budget can be static and/or dynamic. Although two interference budgets and two channels are described herein, it is contemplate that any number of channels can be allotted any number of respective interference budgets for uplink scheduling. Thus, for instance, user selector 212 can schedule a cell-boundary user upon a first channel with a good interference budget and a close-to-base station user upon a second channel with a bad interference budget.

Figure 3:
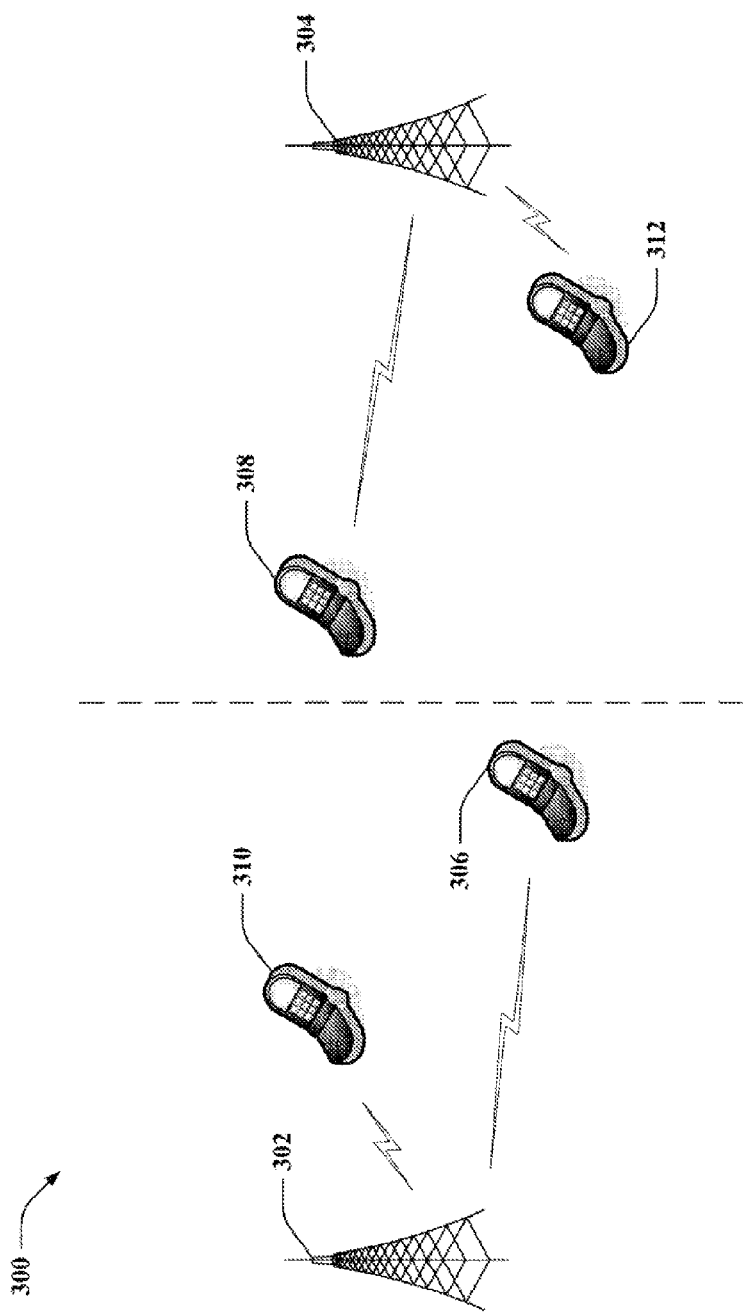
FIG. 3 is an illustration of an example system that includes multiple cells that can utilize respective time varying interference budgets.

Now referring to FIG. 3, illustrated is an example system 300 that includes multiple cells that can utilize respective time varying interference budgets. System 300 includes a first cell associated with a first base station 302 and a second cell associated with a second base station 304. Although system 300 is depicted to comprise two base stations and two cells, the claimed subject matter contemplates employing any number of base stations and cells. Further, according to the illustrated example, each base station 302-304 can serve a respective cell-boundary mobile device (e.g., base station 302 can serve mobile device 306 and base station 304 can serve mobile device 308) and a respective close-to-base station mobile device (e.g., base station 302 can serve mobile device 310 and base station 304 can serve mobile device 312); however, it is to be appreciated that any number of mobile devices can be served by each base station 302-304 and/or mobile devices can be located at any positions within cells.

Due to the existence of inter and intra cell interference, sustainable rates typically utilized in conventional systems might not provide optimal achievable rates for the users. According to an illustration where two adjacent cells each include a respective cell-boundary mobile device (e.g., cell-boundary mobile devices 306-308), the interference generated by each of these mobile devices to the non-serving base station can be substantially similar to the signal strength to their respective serving base station. Moreover, due to the symmetry of mobiles, conventionally techniques employing sustainable rates oftentimes allow these cell-boundary mobile devices to transmit at full power and the resulting rate vector can consist of two identical entries which correspond to the rates achieved at zero SINR.

In contrast, system 300 enables time sharing between mobiles such that different mobile devices 306-312 transmit at different time slots. Pursuant to the above two-mobile two-base station example, time slots for transmission for each cell-boundary mobile devices 306-308 can be alternated. By time sharing, mobile devices 306-308 can transmit less frequently; however, SINR gains can compensate for the loss in degrees of freedom and thus benefit both mobile devices 306-308. Thus, improvement can be obtained by removing the sustainable condition on the rates typically associated with conventional techniques.

Moreover, in connection with scheduling uplink transmissions, path loss ratios can be determined for mobile devices 306-312 (e.g., mobile devices 306-312 can each generate respective channel quality reports pertaining to their evaluated path loss ratios, and the channel quality reports can be communicated to base stations 302-304 for scheduling uplink transmissions by mobile devices 306-312). The path loss ratio can be evaluated according to the following:

$$\alpha_i = \frac{\sum_{k \neq c(i)} h_{ik} load_k}{h_{ic(i)}}.$$

According, $\alpha_i$ is the path loss ratio of user i, $h_{ik}$ is the path loss between the user i and cell k, $h_{ic(i)}$ is the path loss between the user i and the serving cell c(i), and $load_k$ is the loading factor assigned by cell k. For instance, the loading factor can be static or dynamic. Moreover, the path loss ratio can be greater for cell-boundary mobile devices 306-308 in comparison to close-to-base station mobile devices 310-312 (e.g., close-to-base station mobile devices 310-312 can create less interference to neighboring, non-serving base stations since their path losses can be lower).

Differences in the path loss ratios for the mobile devices 306-312 can be leveraged for uplink scheduling on the basis of the time varying interference budget. By way of illustration, the first cell associated with base station 302 can have a high interference budget and the second cell associated with base station 304 can have a low interference budget at a particular time. Further, base station 302 can schedule cell-boundary mobile device 306 for uplink transmission during this time slot, while base station 304 can refrain from scheduling cell-boundary mobile device 308 at this time; rather, close-to-base station mobile device 312 can be scheduled by base station 304 during this time slot.

Figure 4:
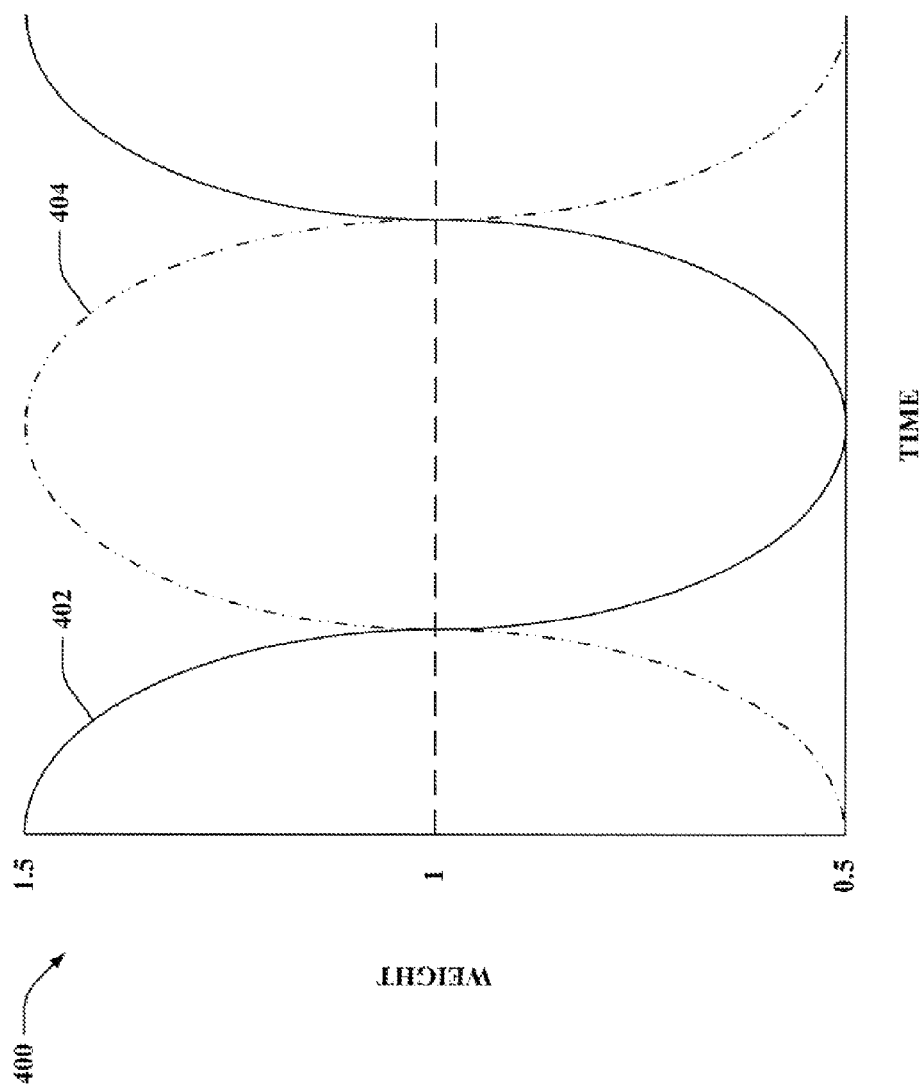
FIG. 4 is an illustration of an example weighting diagram for varying interference budgets as a function of time.

Referring now to FIG. 4, illustrated is an example weighting diagram 400 for varying interference budgets as a function of time. Diagram 400 depicts two weighting curves 402 and 404 that vary between 0.5 and 1.5 over time. Each base station (e.g., base station 202 of FIG. 2, base stations 302-304 of FIG. 3, ...) in a network can be associated with a particular one of the weighting curves 402-404. For example, base station 302 can utilize weighting curve 402 and base station 304 can employ weighting curve 404; however, the claimed subject matter is not so limited. During each time slot, the base station can multiply an interference budget by the weight set forth in the respective weighting curve 402-404, and the resultant value can be utilized by the base station for scheduling mobile device(s) for uplink transmissions. Further, nearby base stations can utilize differing weighting curves from the set of weighting curves.

Although two weighting curves 402-404 are shown, it is contemplated that any number of weighting curves can be utilized. Moreover, it is to be appreciated that the claimed subject matter is not limited to employing sinusoidal weighting curves; rather, any time varying patterns can be utilized (e.g., patterns need not be smooth curves). For example, any complementary weighting patterns can be used such that the sum of all weighting patterns can be constant over time. By way of illustration, time varying patterns of discrete weights can be used; however, the claimed subject matter is not so limited. Further, the claimed subject matter is not limited to employing a weight that varies between 0.5 and 1.5.

Figure 5:
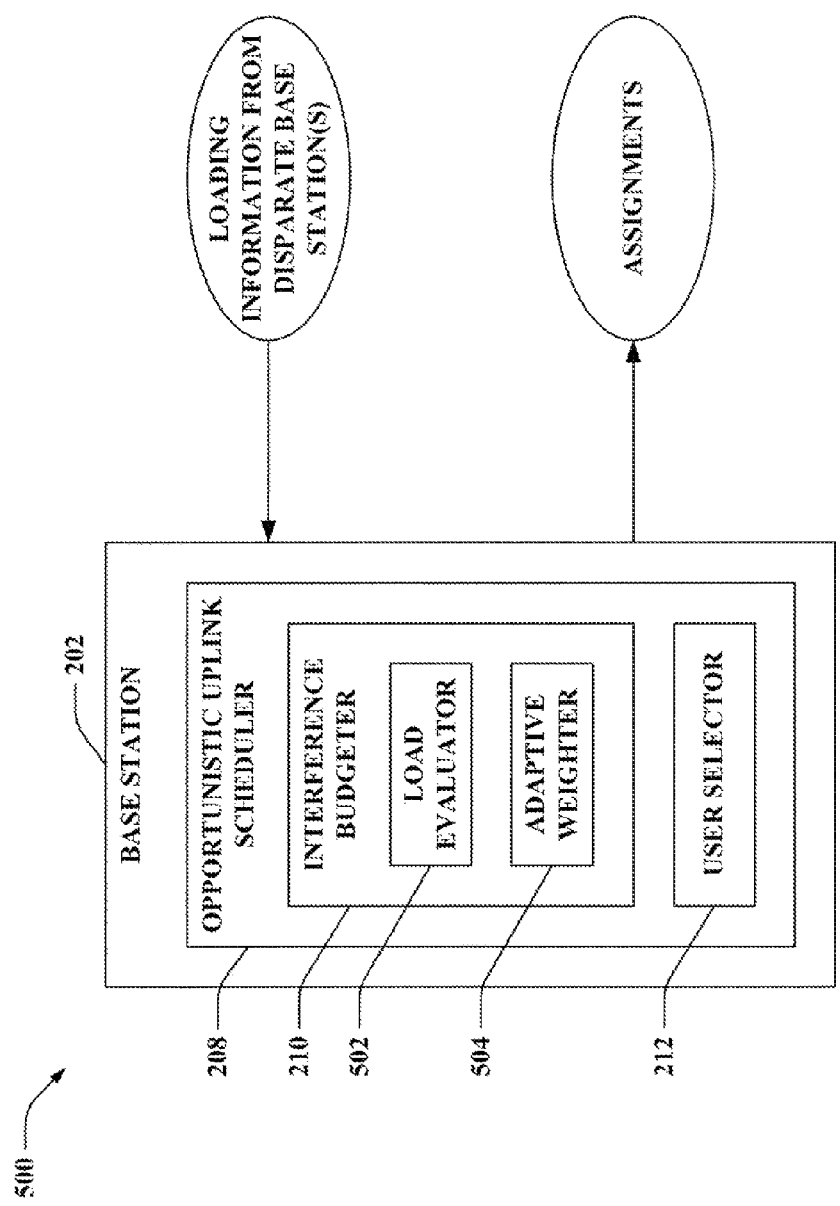
FIG. 5 is an illustration of an example system that adaptively adjusts interference budget weighting based upon load for time varying uplink scheduling.

Now turning to FIG. 5, illustrated is a system 500 that adaptively adjusts interference budget weighting based upon load for time varying uplink scheduling. System 500 includes base station 202 that can further comprise opportunistic uplink scheduler 208, interference budgeter 210, and user selector 212 as described above. Further, interference budgeter 210 can include a load evaluator 502 and an adaptive weighter 504.

Load evaluator 502 can analyze loading information from disparate base station(s) and/or loading information associated with base station 202. For instance, base station(s) can share loading information with nearby base stations to enable such analysis. According to another example, loading information from each base station can be collected by a network device (not shown), and base station 202 can thereafter retrieve such loading information. Load evaluator 502 can compare numbers of mobile devices served by each base station, path loss ratios of mobile devices served by each base station (e.g., which can relate to positions of mobile devices within cells, interference yielded by such mobile devices, ...), and so forth. According to an illustration, load evaluator 502 can determine that base station 202 serves one hundred mobile devices while a neighboring base station serves ten mobile devices; however, the claimed subject matter is not so limited.

Adaptive weighter 504 can adjust the weighting utilized by interference budgeter 210 based upon the analyzed loading information. For instance, adaptive weighter 504 can alter the weighting in real time based upon network loading. Following the above illustration where base station 202 serves one hundred mobile devices and the neighboring base station serves ten mobile device, adaptive weighter 504 can shift a mean of the weights utilized by interference budgeter 210 higher in comparison to a mean of the weights employed by an interference budgeter of the neighboring base station;

however, the claimed subject matter is not so limited as it is contemplated that any variation can be made by adaptive weighter 504 (e.g., adaptive weighter 504 can alter frequency, mean, periodicity, offset, pattern, pattern type, . . . ). Moreover, according to another illustration, adaptive weighter 504 can enable altering a loading factor provided to mobile device(s) to generate path loss ratio(s) in addition to or instead of varying the weighted interference budget.

Thereafter, mobile device(s) can be chosen by user selector 212 for scheduling upon the uplink based upon the adaptive, time varying, weighted interference budget. Accordingly, assignment(s) can be yielded (e.g., transferred to respective mobile devices) in response to such selections. The assignments can include information related to time slot, duration, channel, frequency (e.g., tone(s)), power level, rate, and so forth to be utilized by a mobile device for uplink transmission.

Figure 6:
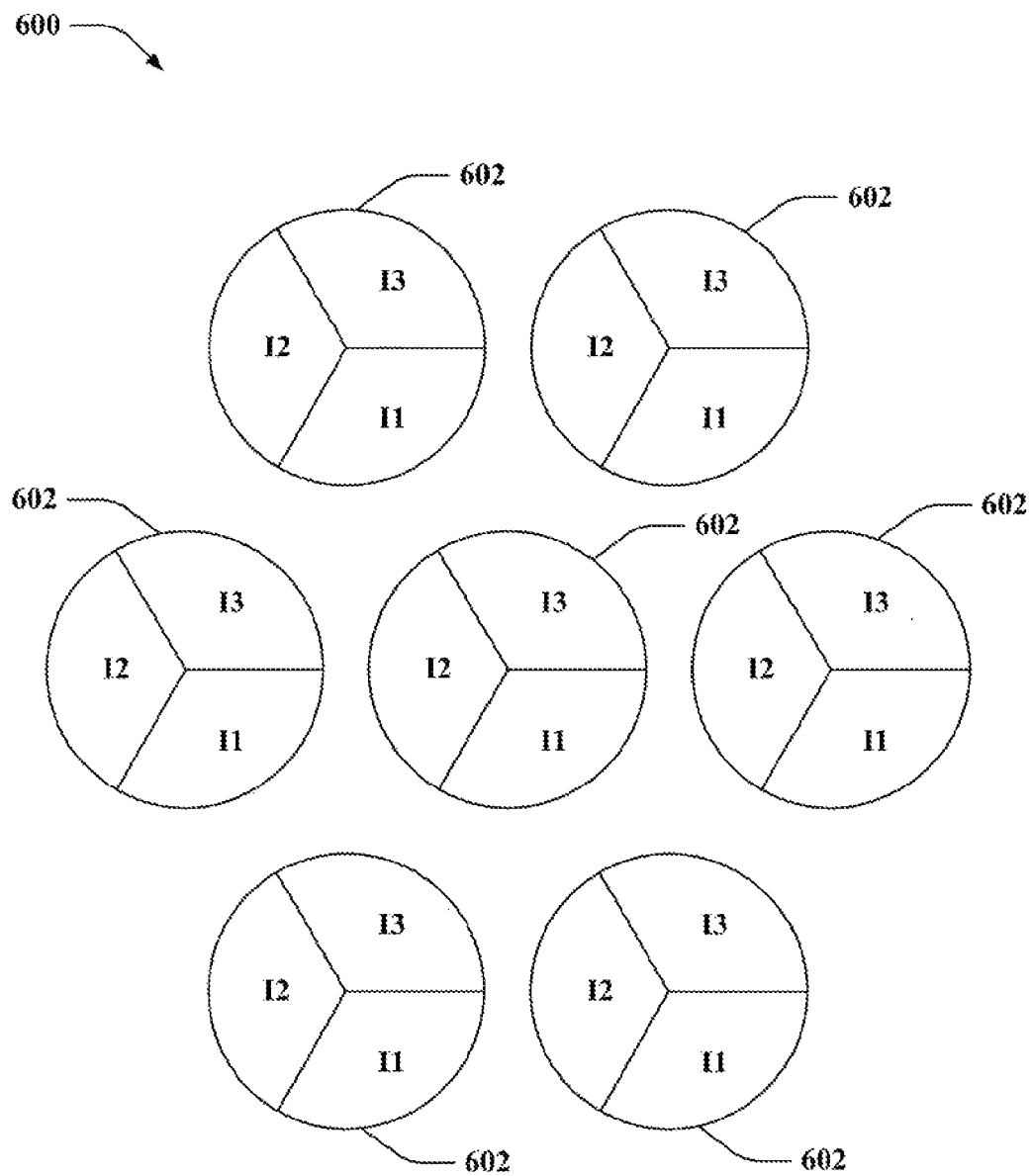
FIG. 6 is an illustration of an example sector-wise reuse multi-cell deployment in accordance with various aspects of the claimed subject matter.

Turning to FIG. 6, illustrated is an example sector-wise reuse multi-cell deployment 600 in accordance with various aspects of the claimed subject matter. As depicted, the multi-cell deployment 600 can comprise multiple cells 602 dispersed over a geographic area to form a communication network. Each of the cells 602 can include three sectors as shown; however, it is contemplated that one or more of the cells 602 can include fewer than and/or greater than three sectors. Further, it is to be appreciated that the multi-cell deployment 600 can support multiple carriers and/or a single carrier.

The sectorized cells 602 can be located in a regular hexagon grid and can extend beyond the grid depicted (e.g., any number of cells 602 can be included in the grid, . . . ). For each of the sectors of the cells 602, an interference budget (e.g., I1, I2, I3, . . . ) can be chosen. For instance, the interference budgets can be weighted and can vary as a function of time. Pursuant to another illustration, the interference budgets can be static. Further, the interference budgets can be reused across all of the sectors. According to the illustrated example, three distinct interference budgets can respectively be allocated to each of the three sectors of each of the cells 602; thus, sector 1 can be allocated interference budget 1 (I1), sector 2 can be allocated interference budget 2 (P2), and sector 3 can be allocated interference budget 3 (P3). Moreover, the same pattern can be reused across all of the cells 602.

Additionally, pursuant to an illustration where multiple carriers are supported for uplink communication in each sector, each sector can utilize a set of interference budgets. Further, each interference budget in the set can correspond to a particular carrier (e.g., the set can include a first interference budget that relates to a first carrier and a second interference budget that relates to a second carrier utilized in a particular sector, . . . ). Thus, I1, I2, and I3 as shown in the deployment 600 can represent three distinct sets of interference budgets.

Figure 7:
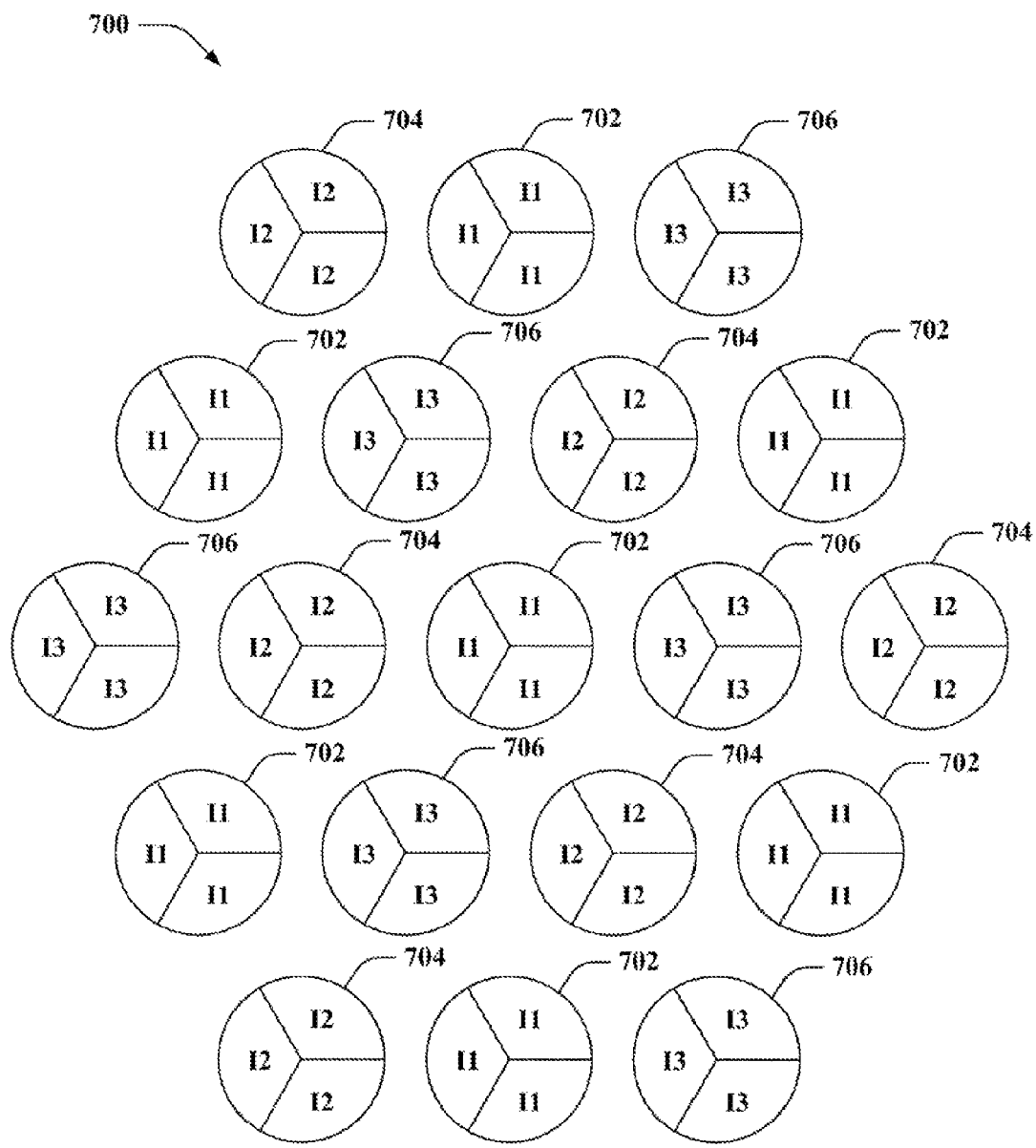
FIG. 7 is an illustration of an example cell-wise reuse deployment of multiple cells for an interference budget reuse scheme.

FIG. 7 illustrates an example cell-wise reuse deployment 700 of multiple cells for an interference budget reuse scheme. A plurality of cells 702, 704, 706 are included within the grid associated with the deployment 700. As shown, the cells 702-706 include three sectors; however, the claimed subject matter is not limited to utilization of cells with three sectors. The deployment 700 can be employed when leakages from intra-cell sectors are significant. In particular, the deployment 700 can use a substantially similar interference budget (or set of interference budgets that each correspond to a particular carrier in a multi-carrier scenario) for sectors inside the same cell and different interference budgets (or sets of interference budgets) across different cells. Thus, according to the depicted example, cells 702 can include three sectors that utilize interference budget 1 (I1) (or set of interference budgets I1), cells 704 can include three sectors that employ interference budget 2 (I2) (or set of interference budgets I2), and cells 706 can include three sectors that use interference budget 3 (I3) (or set of interference budgets I3). Further, each cell 702 can be adjacent to cell(s) 704 and/or cell(s) 706 (and cells 704 and cells 706 can similarly be adjacent to differing types of cells), and therefore, adjacent cells can utilize differing interference budgets (e.g., a cell 702 is not directly adjacent to another cell 702). It is contemplated, however, that any number of differing interference budgets (or sets of interference budgets) can be employed by different cells, and thus, the claimed subject matter is not limited to the illustrated example.

Figure 8:
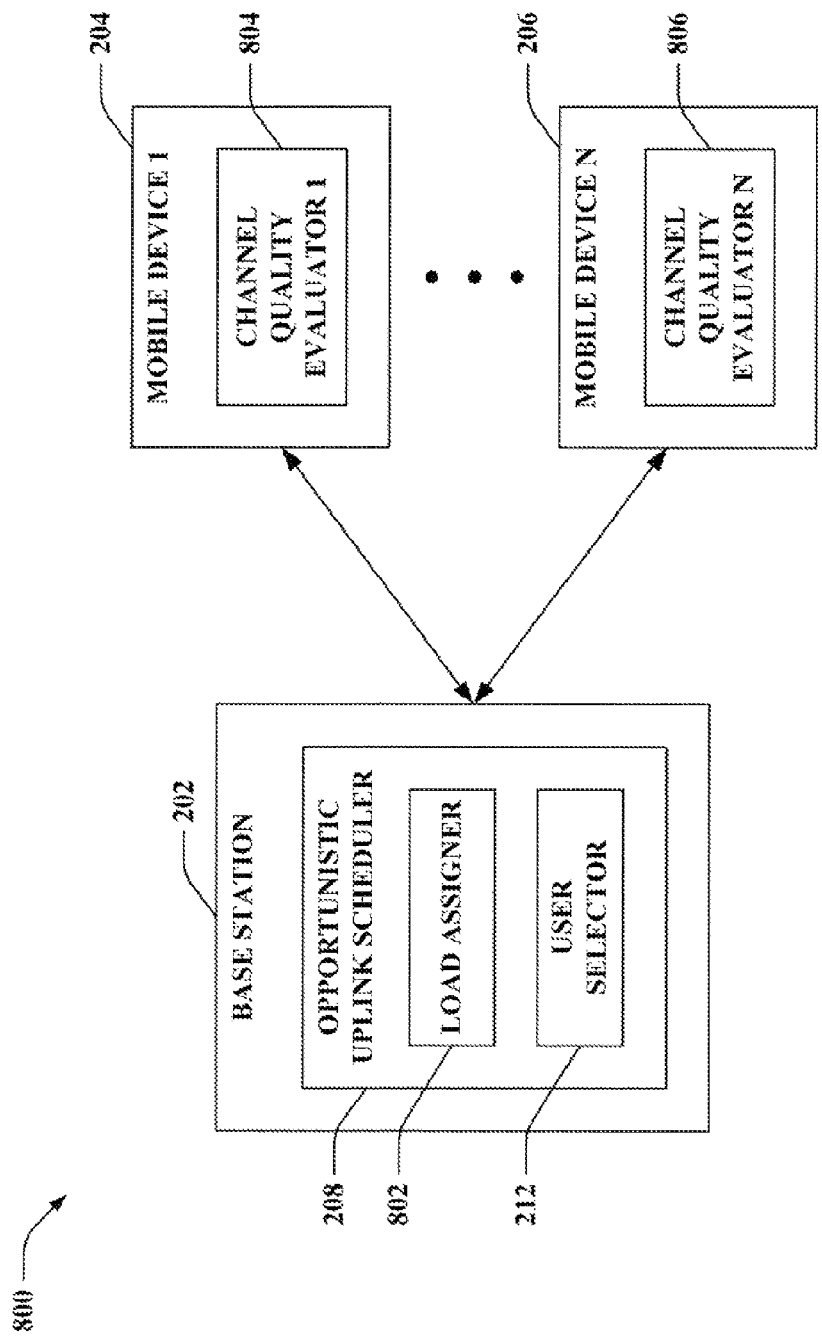
FIG. 8 is an illustration of an example system that schedules uplink transmissions based upon channel quality report(s) obtained from mobile device(s) generated as a function of assigned loading factor(s).

Now turning to FIG. 8, illustrated is a system 800 that schedules uplink transmissions based upon channel quality report(s) obtained from mobile device(s) generated as a function of assigned loading factor(s). System 800 includes base station 202 that communicates with mobile devices 204-206. Base station 202 comprises opportunistic uplink scheduler 208, which can further include a load assigner 802 and user selector 212. Moreover, each mobile device 204-206 can include a respective channel quality evaluator 804-806 (e.g., mobile device 1 204 includes channel quality evaluator 1 804, . . . , mobile device N 206 includes channel quality evaluator N 806).

Load assigner 802 identifies a loading factor to be utilized by mobile devices 204-206 in connection with determining respective path loss ratios of mobile devices 204-206. The loading factor can be a function of a loading status (e.g., number of users) of base station 202 (or a sector of base station 202), for instance. For example, the loading factor selected by load assigner 802 can be determined as a function of time (e.g., dynamic). By way of another illustration, the loading factor identified by load assigner 802 can be static (e.g., preset based upon an identity of a sector, a cell, etc.). Further, load assigner 802 enables communicating the loading factor to mobile devices 204-206; for instance, load assigner 802 can effectuate broadcasting the loading factor to mobile devices 204-206. By way of another illustration, load assigner 802 can identify and communicate a plurality of loading factors, and each of the loading factors can be utilized by mobile devices 204-206 to evaluate path loss ratios corresponding to respective carriers.

Mobile devices 204-206 obtain the loading factor(s) from base station 202. Thereafter, channel quality evaluators 804-806 determine respective path loss ratios for mobile devices 204-206 as a function of the received loading factor(s). The path loss ratios can be analyzed according to $$\alpha_i = \frac{\sum_{k \neq c(i)} h_{ik} load_k}{h_{ic(i)}},$$

where $\alpha_i$ is the path loss ratio of user i, $h_{ik}$ is the path loss between the user i and cell k, $h_{ic(i)}$ is the path loss between the user i and the serving cell c(i), and $load_k$ is the loading factor assigned by cell k. Channel quality evaluators 804-806 can yield channel quality reports that include information associated with the analyzed path loss ratios (e.g., an interference ratio in a channel between a signal strength from a serving base station to the mobile device and a weighted sum of signal strengths from interfering sectors where the weight is a function of the loading factor). Moreover, channel quality evaluators 804-806 can enable transmitting the channel quality reports to base station 202.

Base station 202 receives the channel quality reports from mobile devices 204-206. Opportunistic uplink scheduler 208 (and/or user selector 212) can schedule one or more mobile devices 204-206 for uplink transmission based upon the channel quality reports. Moreover, opportunistic uplink scheduler 208 can transmit an assignment to the scheduled mobile device(s) 204-206 related to the scheduled uplink transmission. For instance, the assignment can include a maximum interference budget allocated to the scheduled mobile device(s) 204-206 for uplink transmission.

Figure 9:
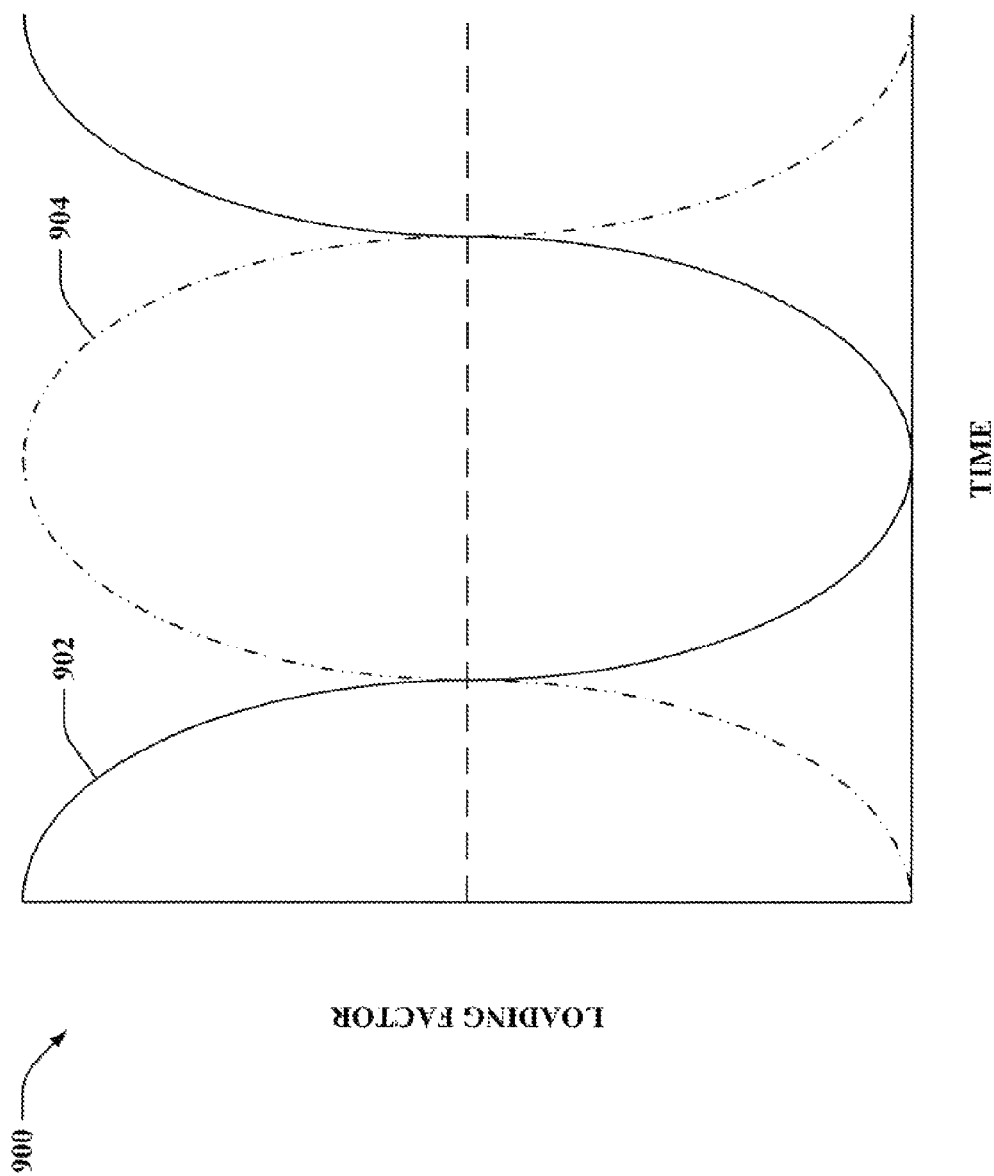
FIG. 9 is an illustration of an example diagram depicting time varying loading factors.

With reference to FIG. 9, illustrated is an example diagram 900 depicting time varying loading factors. Diagram 900 includes two loading factor curves 902 and 904 that can be utilized by disparate base stations, cells, sectors, etc. in a network. For example, a first sector can employ loading factor curve 902 and a second sector can utilize loading factor curve 904 for selecting respective loading factors to assign to mobile devices for generating channel quality reports; however, the claimed subject matter is not so limited. Further, nearby base stations, cells, sectors, etc. can utilize differing loading factor curves. Although two loading factor curves 902-904 are shown, it is contemplated that any number of loading factor curves can be employed. Moreover, it is contemplated that the claimed subject matter is not limited to employing sinusoidal loading factor curves; rather, any time varying patterns can be utilized (e.g., patterns need not be smooth curves, patterns can include discrete loading factor values, . . . ). Additionally, loading factor curves associated with differing base stations, cells, sectors, etc. need not have substantially similar frequencies, amplitudes, etc. as shown; instead, loading factor curves can have differing frequencies, amplitudes, and the like. Also, any time shift between loading factor curves can be employed.

Figure 10:
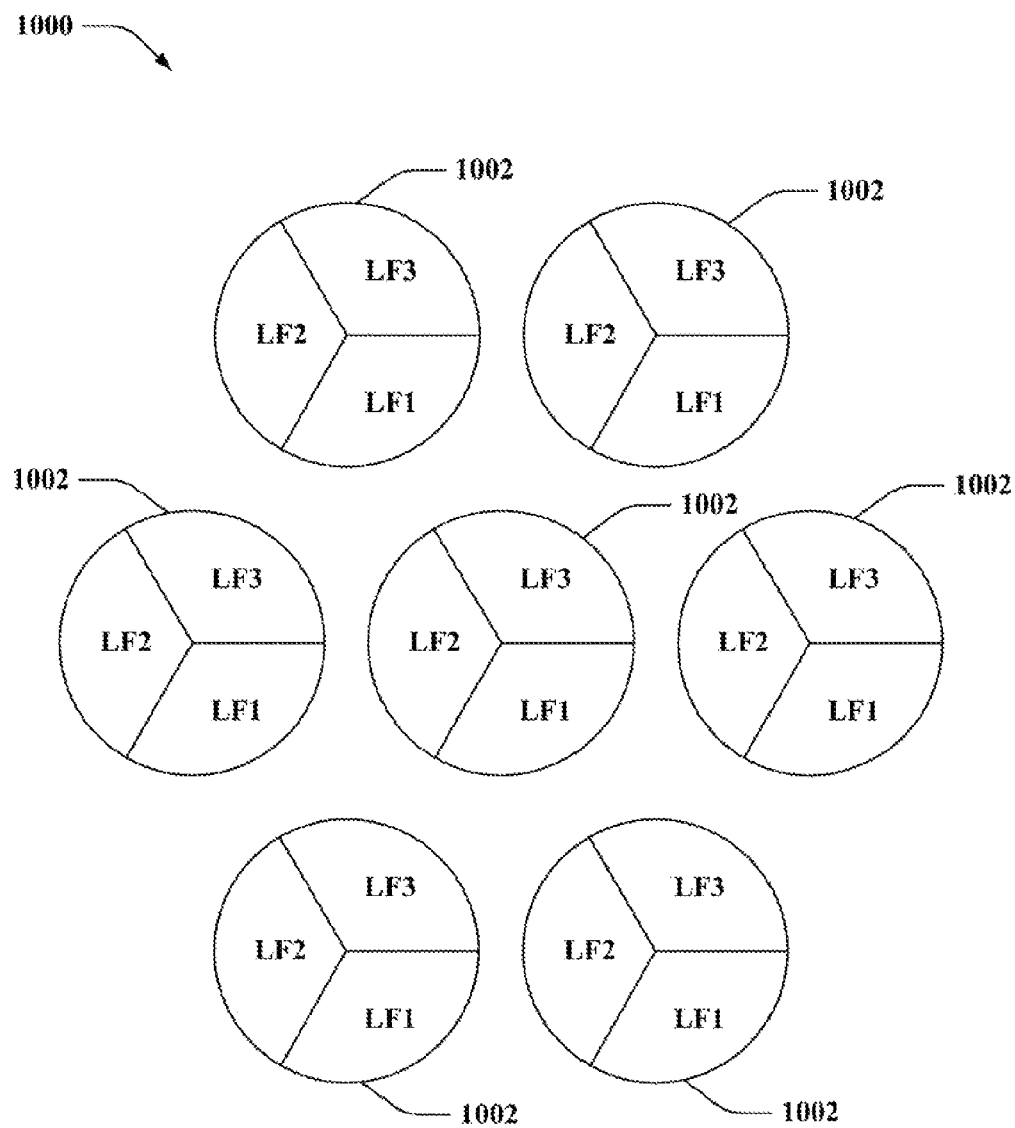
FIG. 10 is an illustration of an example sector-wise reuse multi-cell deployment in accordance with various aspects of the claimed subject matter.

Turning to FIG. 10, illustrated is an example sector-wise reuse multi-cell deployment 1000 in accordance with various aspects of the claimed subject matter. As depicted, the multi-cell deployment 1000 can comprise multiple cells 1002 dispersed over a geographic area to form a communication network. Each of the cells 1002 can include three sectors as shown; however, it is contemplated that one or more of the cells 1002 can include fewer than and/or greater than three sectors. Further, it is to be appreciated that the multi-cell deployment 1000 can support multiple carriers and/or a single carrier. The sectorized cells 1002 can be located in a regular hexagon grid and can extend beyond the grid depicted (e.g., any number of cells 1002 can be included in the grid, . . . ). For each of the sectors of the cells 1002, a loading factor (e.g., LF1, LF2, LF3, . . . ) can be chosen. For instance, the loading factors can vary as a function of time (e.g., a time varying loading factor pattern can be employed). Pursuant to another illustration, the loading factors can be static. Further, the loading factors can be reused across all of the sectors. According to the illustrated example, three distinct loading factors can respectively be allocated to each of the three sectors of each of the cells 1002; thus, sector 1 can be allocated loading factor 1 (LF1), sector 2 can be allocated loading factor 2 (LF2), and sector 3 can be allocated loading factor 3 (LF3). Moreover, the same pattern can be reused across all of the cells 1002.

Additionally, pursuant to an illustration where multiple carriers are supported for uplink communication in each sector, each sector can utilize a set of loading factors. Further, each loading factor in the set can correspond to a particular carrier (e.g., the set can include a first loading factor that relates to a first carrier and a second loading factor that relates to a second carrier utilized in a particular sector, . . . ). Thus, LF1, LF2, and LF3 as shown in the deployment 1000 can represent three distinct sets of loading factors.

Figure 11:
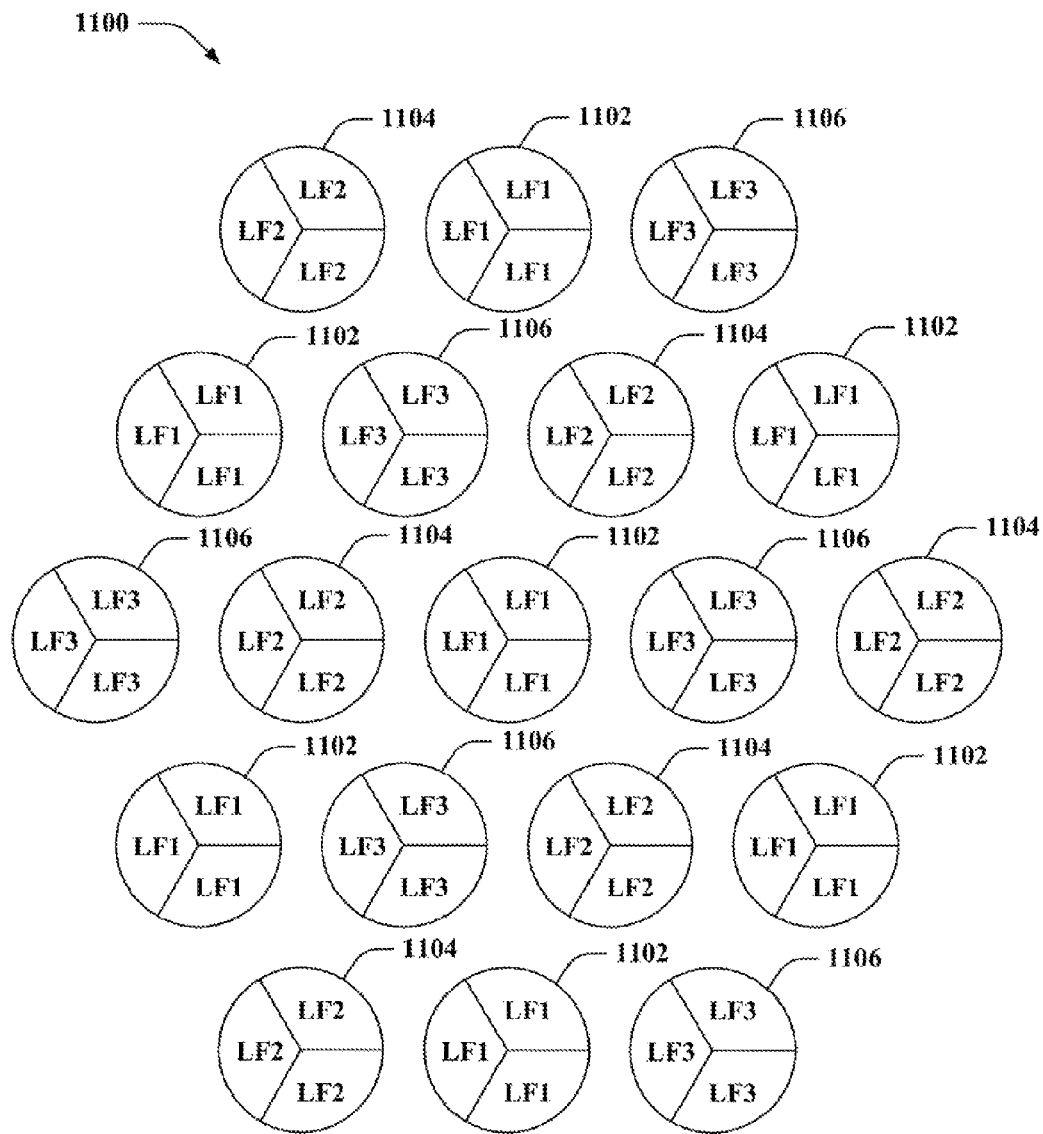
FIG. 11 is an illustration of an example cell-wise reuse deployment of multiple cells for a loading factor reuse scheme.

FIG. 11 illustrates an example cell-wise reuse deployment 1100 of multiple cells for a loading factor reuse scheme. A plurality of cells 1102, 1104, 1106 are included within the grid associated with the deployment 1100. As shown, the cells 1102-1106 include three sectors; however, the claimed subject matter is not limited to utilization of cells with three sectors. The deployment 1100 can be employed when leakages from intra-cell sectors are significant. In particular, the deployment 1100 can use a substantially similar loading factor (or set of loading factors that each correspond to a particular carrier in a multi-carrier scenario) for sectors inside the same cell and different loading factors (or sets of loading factors) across different cells. Thus, according to the depicted example, cells 1102 can include three sectors that utilize loading factor 1 (LF1) (or set of loading factors LF1), cells 1104 can include three sectors that employ loading factor 2 (LF2) (or set of loading factors LF2), and cells 1106 can include three sectors that use loading factor 3 (LF3) (or set of loading factors LF3). Further, each cell 1102 can be adjacent to cell(s) 1104 and/or cell(s) 1106 (and cells 1104 and cells 1106 can similarly be adjacent to differing types of cells), and therefore, adjacent cells can utilize differing loading factors (e.g., a cell 1102 is not directly adjacent to another cell 1102). It is contemplated, however, that any number of differing loading factors (or sets of loading factors) can be employed by different cells, and thus, the claimed subject matter is not limited to the illustrated example.

Referring to FIGS. 12-18, methodologies relating to opportunistic uplink scheduling in a wireless communication network are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 12:
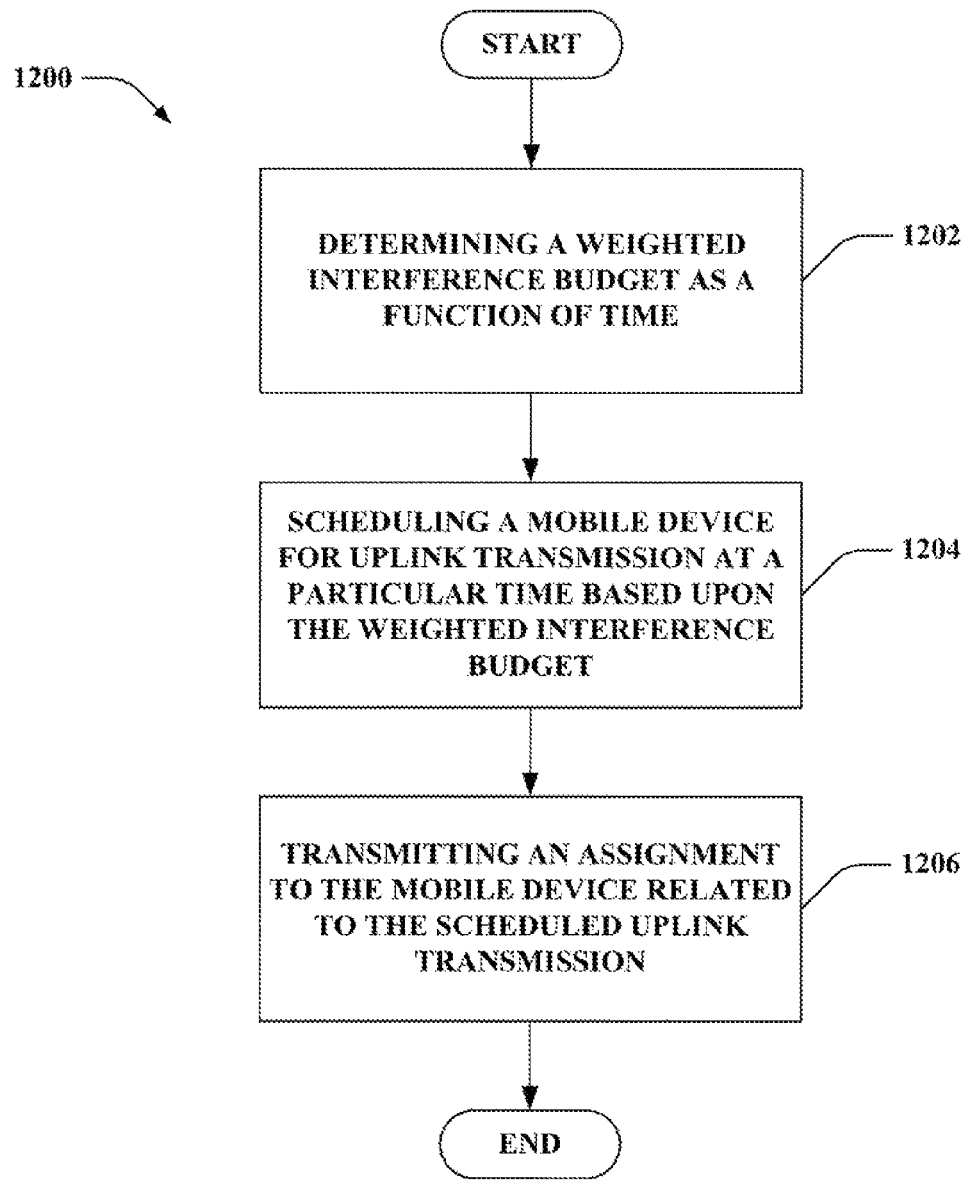
FIG. 12 is an illustration of an example methodology that facilitates scheduling uplink transmission based upon a consideration of time.

Turning to FIG. 12, illustrated is a methodology 1200 that facilitates scheduling uplink transmission based upon a consideration of time. At 1202, a weighted interference budget can be determined as a function of time. The interference budget can be time varying and/or can be multiplied by a weighting factor that can be time varying. Further, the weighted interference budget can vary according to a predefined pattern and/or can follow an adaptively determined pattern (e.g., to enable load balancing). According to another illustration, time varying, weighted interference budgets utilized by nearby base stations (and/or cells) can complement each other; for instance, the sum of the time varying, weighted interference budgets can be constant over time.

At 1204, a mobile device can be scheduled for uplink transmission at a particular time based upon the weighted interference budget. For example, a mobile device with a large path loss ratio (e.g., cell-boundary mobile device) can be scheduled when the weighted interference budget is relatively large and a mobile device with a small path loss ratio (e.g., close-to-base station mobile device) can be scheduled when the weighted interference budget is relatively small. At 1206, an assignment can be transmitted to the mobile device related to the scheduled uplink transmission. For instance, the assignment can include information pertaining to time slot, duration, frequency (e.g., tone(s)), power level, rate, and so forth to be utilized by the mobile device for uplink transmission.

Figure 13:
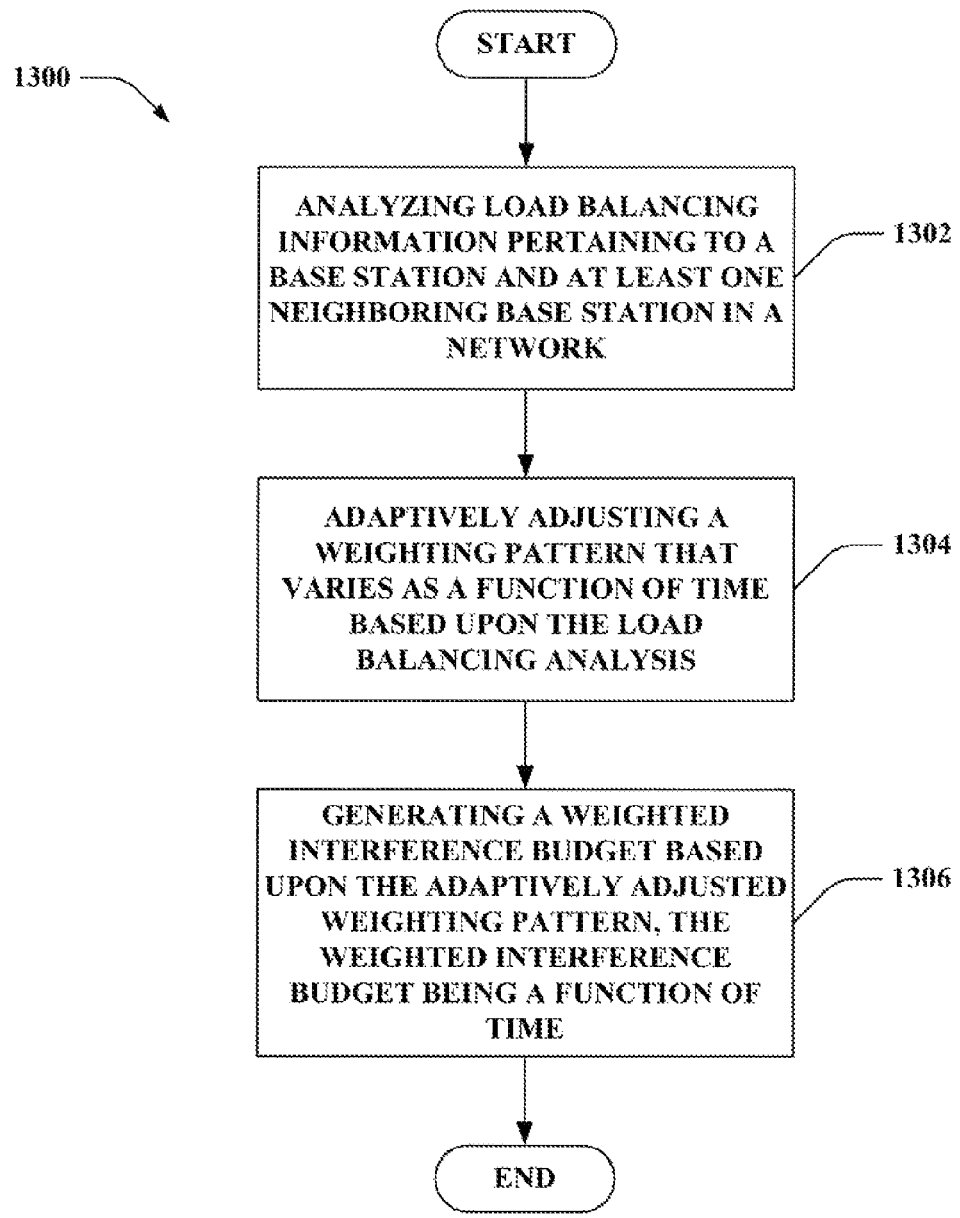
FIG. 13 is an illustration of an example methodology that facilitates altering a time variation of a weighted interference budget to enable load balancing.

Now referring to FIG. 13, illustrated is a methodology 1300 that facilitates altering a time variation of a weighted interference budget to enable load balancing. At 1302, load balancing information pertaining to a base station and at least one neighboring base station in a network can be analyzed. For instance, a number of users served by each base station can be compared. According to another illustration, the types of users and/or path loss ratios associated with the users of each of the base stations can be evaluated. At 1304, a weighting pattern that varies as a function of time can be adaptively adjusted based upon the load balancing analysis. By way of example, a mean value of the time varying weighting pattern can be increased for the base station when such base station serves a greater number of users than the neighboring base station(s). Further, it is contemplated that the weighting pattern can be adaptively adjusted in real time, periodically, etc. At 1306, a weighted interference budget can be generated based upon the adaptively adjusted weighting pattern, where the weighted interference budget can be a function of time. The weighted interference budget can be utilized to schedule uplink transmissions.

Figure 14:
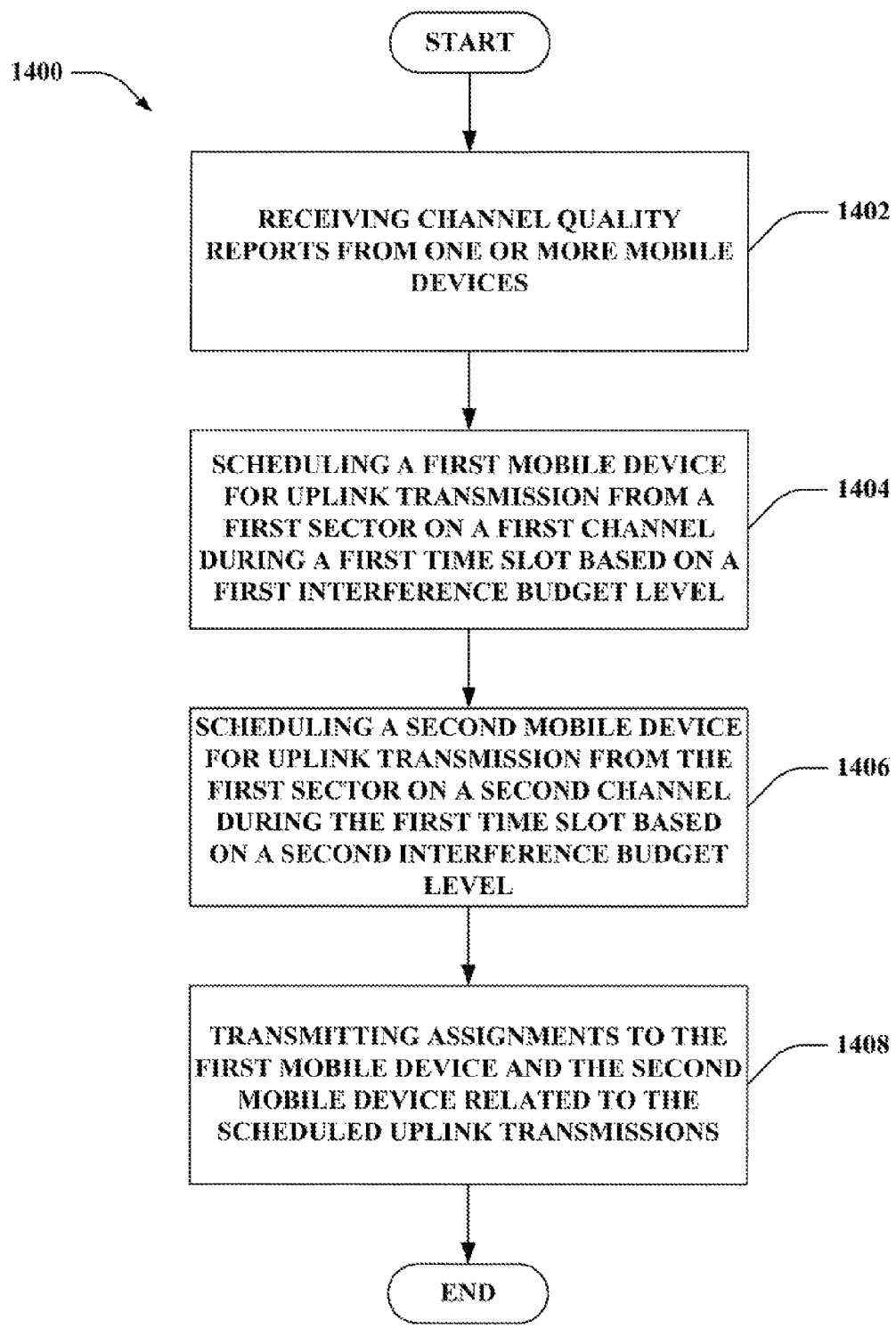
FIG. 14 is an illustration of an example methodology that facilitates scheduling uplink transmissions in a communication network including a first base station that includes a first sector utilizing a static interference budget with multi-carriers.

Referring to FIG. 14, illustrated is a methodology 1400 that facilitates scheduling uplink transmissions in a communication network including a first base station that includes a first sector utilizing a static interference budget with multi-carriers. At 1402, channel quality reports can be received from one or more mobile devices. The channel quality reports can include a measurement of an interference ratio between a signal strength from the serving base station to the mobile device and a weighted sum of signal strengths from interfering base stations. At 1404, a first mobile device can be scheduled for uplink transmission from the first sector on a first channel during a first time slot based on a first interference budget level. For example, the first channel can include a first frequency bandwidth. Further, it is to be appreciated that one or more mobile devices can be scheduled in addition to the first mobile device (and similarly the other mobile devices described below can be scheduled with one or more additional mobile devices). At 1406, a second mobile device can be scheduled for uplink transmission from the first sector on a second channel during the first time slot based on a second interference budget level. The second channel, for instance, can include a second frequency bandwidth. Further, the first frequency bandwidth and the second frequency bandwidth can be non-overlapping. Moreover, the first interference budget level and the second interference budget level can differ from each other by at least 0.5 dB, for example. At 1408, assignments can be transmitted to the first mobile device and the second mobile device related to the scheduled uplink transmissions. By way of illustration, the assignments can include information pertaining to a maximum interference budget assigned to the corresponding mobile device for the uplink transmission. Accordingly, the sum interference emitted from scheduled mobile device(s) upon each channel in the first sector of the first base station at the first time slot can be limited to the respective interference budget levels.

Pursuant to an example, the first base station can include a second sector. Thus, a third mobile device can be scheduled for uplink transmission from the second sector on a third channel during the first time slot based on a third interference budget level, where the third channel can include a third frequency bandwidth. Moreover, a fourth mobile device can be scheduled for uplink transmission from the second sector on a fourth channel during the first time slot based on a fourth interference budget level, where the fourth channel can include a fourth frequency bandwidth. Further, the third and fourth interference budget levels can be at least 0.5 dB different from each other. Additionally, the first frequency bandwidth and the third frequency bandwidth can have at least 50% in common while the second frequency bandwidth and the fourth frequency bandwidth can have at least 50% in common. According to another illustration, the first interference budget level can be greater than the third interference budget level and the second interference budget level can be less than the fourth interference budget level.

According to another example, the communication network can further include a second base station that comprises a third sector. Thus, a fifth mobile device can be scheduled for uplink transmission from the third sector on a fifth channel during the first time slot based on a fifth interference budget level, where the fifth channel can include a fifth frequency bandwidth. Additionally, a sixth mobile device can be scheduled for uplink transmission from the third sector on a sixth channel during the first time slot based on a sixth interference budget, where the sixth channel can include a sixth frequency bandwidth. Thereafter, assignments can be transmitted to the fifth and sixth mobile devices related to the scheduled uplink transmissions. Moreover, the fifth and sixth interference budget levels can differ by at least 0.5 dB.

Figure 15:
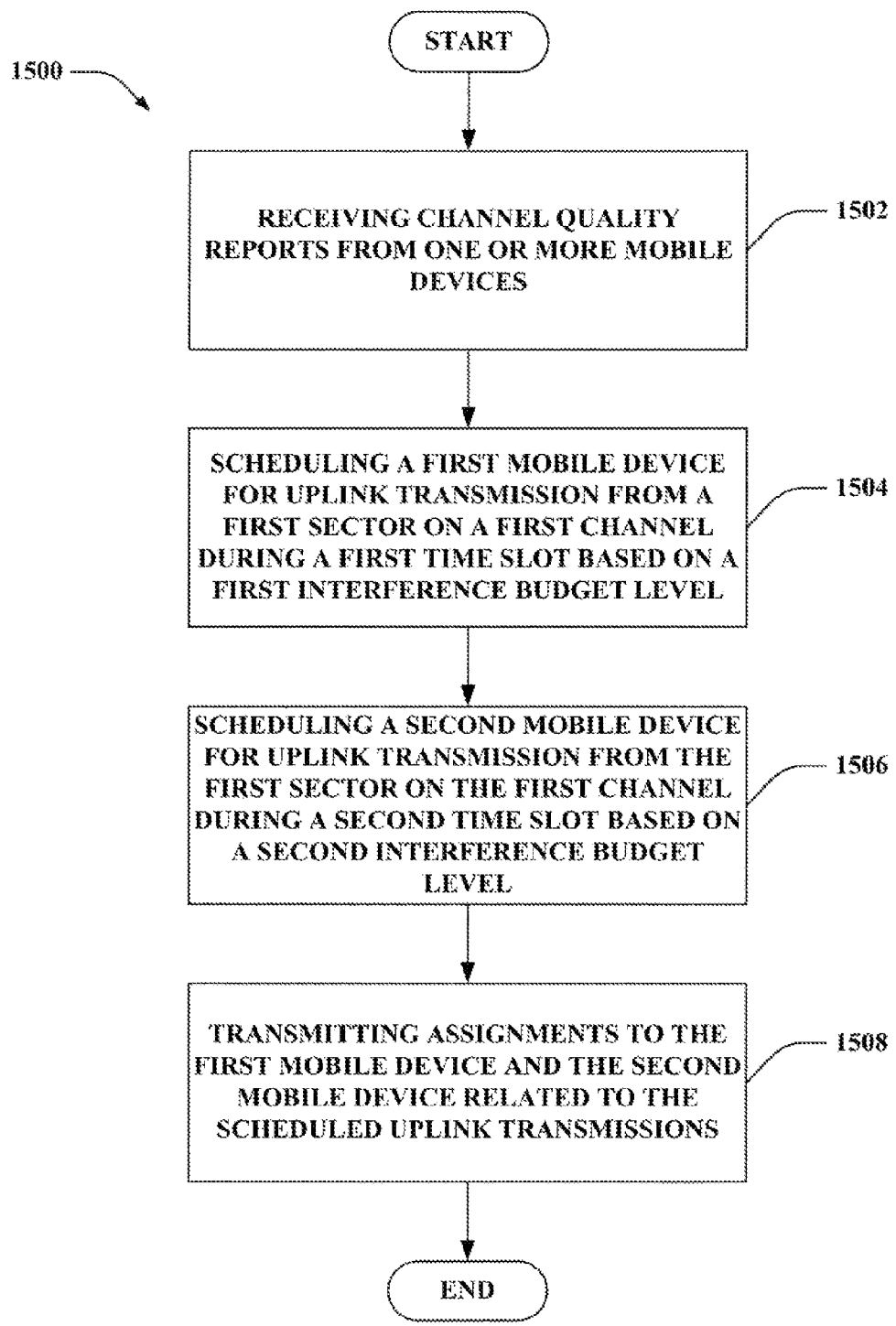
FIG. 15 is an illustration of an example methodology that facilitates scheduling uplink transmissions in a communication network including a first base station that includes a first sector employing a dynamic interference budget.

Turning to FIG. 15, illustrated is a methodology 1500 that facilitates scheduling uplink transmissions in a communication network including a first base station that includes a first sector employing a dynamic interference budget. At 1502, channel quality reports can be received from one or more mobile devices. At 1504, a first mobile device can be scheduled for uplink transmission from a first sector on a first channel during a first time slot based on a first interference budget level. At 1506, a second mobile device can be scheduled for uplink transmission from the first sector on the first channel during a second time slot based on a second interference budget level. Further, the first interference budget level and the second interference budget levels can be determined from a first interference budget pattern that varies over time. The interference budget pattern can be pre-determined, dynamically adjusted, etc. At 1508, assignments can be transmitted to the first mobile device and the second mobile device related to the scheduled uplink transmissions.

According to an example, a third mobile device can be scheduled for uplink transmission from the first sector on a second channel during the first time slot based on a third interference budget level and a fourth mobile device can be scheduled for uplink transmission from the first sector on the second channel during the second time slot based on a fourth interference budget level. Moreover, the third and fourth interference budget levels can be determined from a second interference budget pattern. Additionally, a summation of the first interference budget level and the third interference budget level can be within 0.5 dB from a summation of the second interference budget level and the fourth interference budget level.

Following a further illustration, the first base station can include a second sector. Moreover, a fifth mobile device can be scheduled for uplink transmission from the second sector on the first channel during the first time slot based on a fifth interference budget level. Additionally, a sixth mobile device can be scheduled for uplink transmission from the second sector on the first channel during the second time slot based on a sixth interference budget level, where the fifth and sixth interference budget levels can be determined from a third interference budget pattern. For example, the first and third interference budget patterns can be periodical with dissimilar periods. According to another illustration, the first and third interference budget patterns can be periodical with substantially similar periods and differing phases.

The communication network can further include a second base station that can comprise a third sector, for example. A seventh mobile device can be scheduled for uplink transmission from the third sector on the first channel during the first time slot based on a seventh interference budget level and an eighth mobile device can be scheduled for uplink transmission from the third sector on the first channel during the second time slot based on an eighth interference budget level. Further, the seventh and eighth interference budget levels can be determined from a fourth interference budget pattern.

Figure 16:
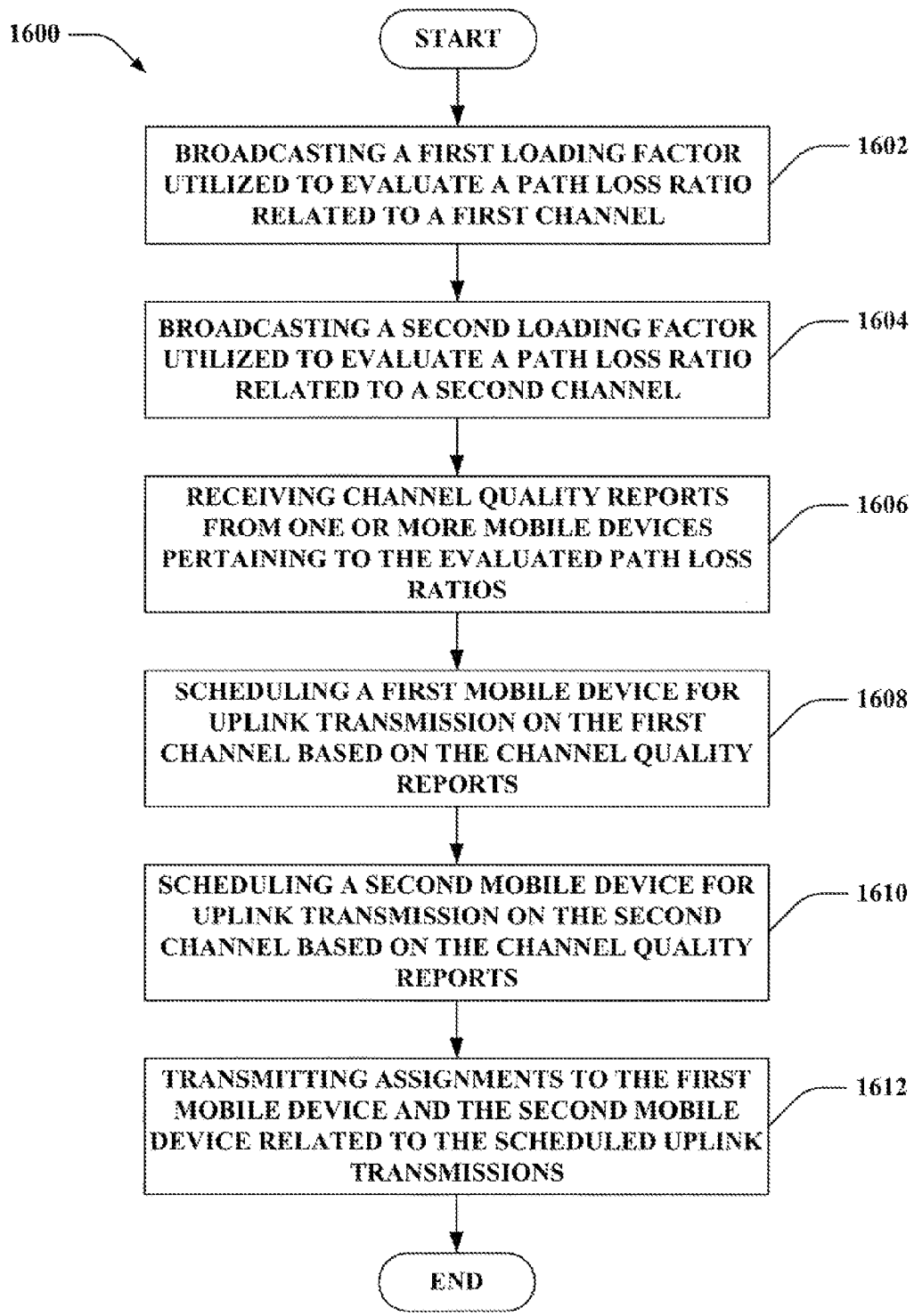
FIG. 16 is an illustration of an example methodology that facilitates scheduling uplink transmissions in a communication network including a first base station that includes a first sector employing static loading offset levels.

With reference to FIG. 16, illustrated is a methodology 1600 that facilitates scheduling uplink transmissions in a communication network including a first base station that includes a first sector employing static loading offset levels. At 1602, a first loading factor utilized to evaluate a path loss ratio related to a first channel can be broadcasted. The first loading factor can be based on at least a first loading offset level. Further, the first loading factor can be a function of a number of mobile devices served on the first channel and the first loading offset level. At 1604, a second loading factor utilized to evaluate a path loss ratio related to a second channel can be broadcasted. The second loading factor can be based on at least a second loading offset level. Moreover, the second loading factor can be a function of a number of mobile devices served on the second channel and the second loading offset level. Moreover, the first loading offset level and the second loading offset level can be at least 0.5 dB different from each other. At 1606, channel quality reports can be received from one or more mobile devices pertaining to the evaluated path loss ratios. The channel quality reports can include measurements of interference ratios related to the first channel and/or second channel. For instance, the measurement of the interference ratio for the first channel can be between a signal strength from the serving base station to the mobile device and the weighted sum of signal strengths from interfering sectors, where the weighting can be a function of the first loading factor (and the interference ratio for the second channel can be similarly determined). At 1608, a first mobile device can be scheduled for uplink transmission on the first channel based on the channel quality reports. The first channel can include a first frequency bandwidth, for example. At 1608, a second mobile device can be scheduled for uplink transmission on the second channel based on the channel quality reports. The second channel can include a second frequency bandwidth, for instance. Further, the first frequency bandwidth and the second frequency bandwidth can be non-overlapping. At 1612, assignments can be transmitted to the first mobile device and the second mobile device related to the scheduled uplink transmissions. The assignments can include a maximum interference budget allocated to the respective mobile devices for utilization with the scheduled uplink transmissions. The loading factors described herein can be functions of loading statuses (e.g., number of users) associated with corresponding sectors. Moreover, the loading offset levels can be offsets from nominal values, which can be the loading factors.

According to another example, the first base station can further include a second sector. Moreover, a third loading factor based on a third loading offset level utilized to evaluate a path loss ratio corresponding to the second sector and related to the first channel can be broadcasted, a fourth loading factor based on a fourth loading offset level utilized to evaluate a path loss ratio corresponding to the second sector and related to the second channel can be broadcasted, and channel quality reports from one or more mobile devices can be received. Further, a third mobile device can be scheduled for uplink transmission on the first channel based on the channel quality reports, a fourth mobile device can be scheduled for uplink transmission on the second channel based on the channel quality reports, and assignments can be transmitted to the third mobile device and the fourth mobile device related to the scheduled uplink transmissions. The third and fourth loading offset levels, for example, can be at least 0.5 dB different from one another. Additionally, the first loading offset level can be greater than the third loading offset level and the second loading offset level can be less than the fourth loading offset level.

Pursuant to a further illustration, the communication network can include a second base station that includes a third sector. A fifth loading factor based on a fifth loading offset level utilized to evaluate a path loss ratio corresponding to the third sector and related to the first channel can be broadcasted, a sixth loading factor based on a sixth loading offset level utilized to evaluate a path loss ratio corresponding to the third sector and related to the second channel can be broadcasted, and channel quality reports from one or more mobile devices can be received. Further, a fifth mobile device can be scheduled for uplink transmission on the first channel based on the channel quality reports, a sixth mobile device can be scheduled for uplink transmission on the second channel based on the channel quality reports, and assignments can be transmitted to the fifth mobile device and the sixth mobile device related to the scheduled uplink transmissions. Moreover, the first loading offset level can be greater than the fifth loading offset level and the second loading offset level can be less than the sixth loading offset level.

Figure 17:
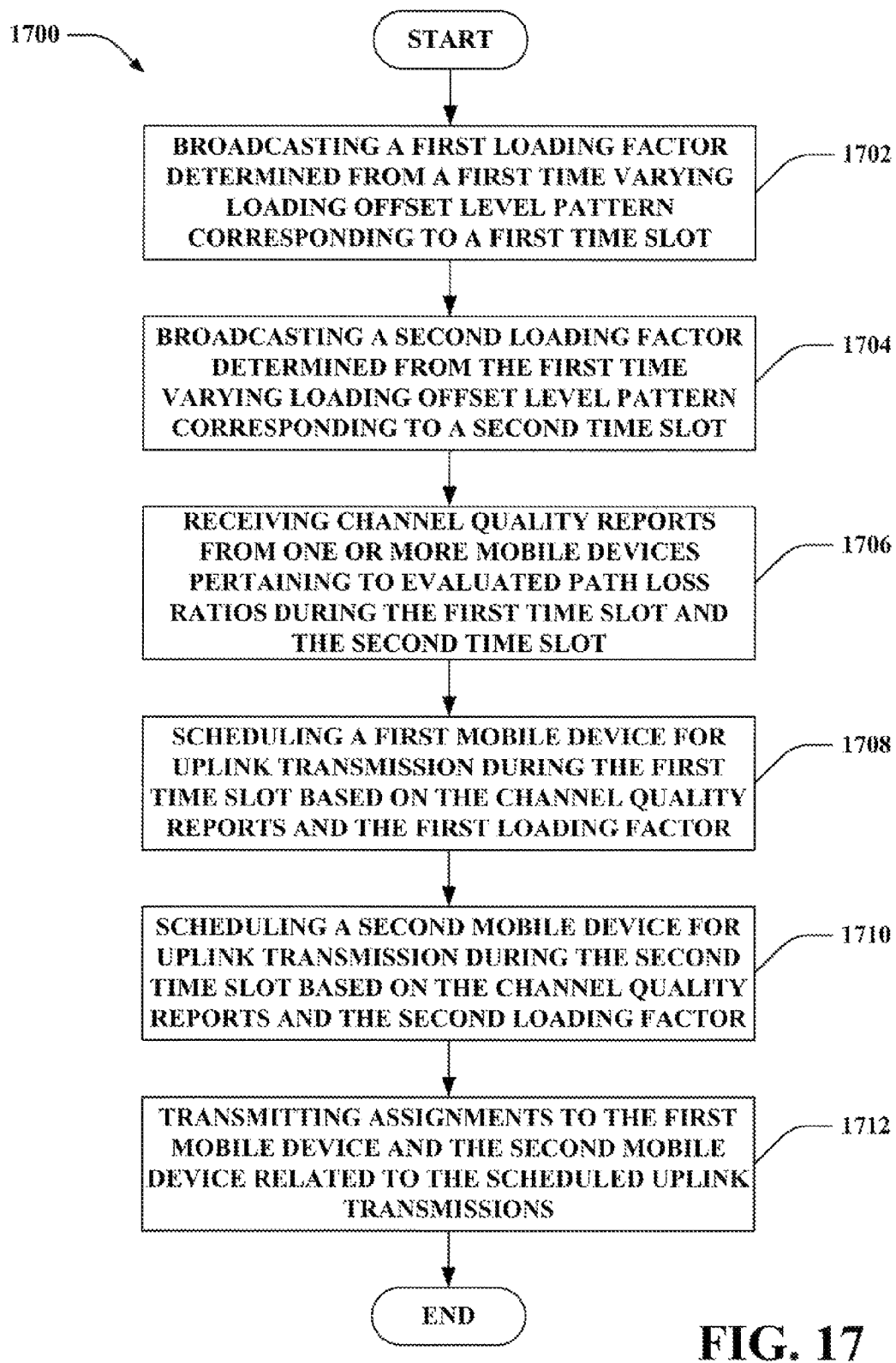
FIG. 17 is an illustration of an example methodology that facilitates scheduling uplink transmissions in a communication network including a first base station that includes a first sector utilizing dynamic loading offset level pattern(s).

Turning to FIG. 17, illustrated is a methodology 1700 that facilitates scheduling uplink transmissions in a communication network including a first base station that includes a first sector utilizing dynamic loading offset level pattern(s). At 1702, a first loading factor determined from a first time varying loading offset level pattern corresponding to a first time slot can be broadcasted. The first loading factor can be based on a first loading offset level. At 1704, a second loading factor determined from the first time varying loading offset level pattern corresponding to a second time slot can be broadcasted. The second loading factor can be based on a second loading offset level. The first loading offset level and the second loading offset level can differ by at least 0.5 dB. At 1706, channel quality reports can be received from one or more mobile devices pertaining to evaluated path loss ratios during the first time slot and the second time slot. At 1708, a first mobile device can be scheduled for uplink transmission during the first time slot based on the channel quality reports and the first loading factor. At 1710, a second mobile device can be scheduled for uplink transmission during the second time slot based on the channel quality reports and the second loading factor. The first mobile device and the second mobile device can be scheduled for uplink transmission upon a first channel, which can include a first frequency bandwidth. At 1712, assignments can be transmitted to the first mobile device and the second mobile device related to the scheduled uplink transmissions.

By way of illustration, a third loading factor based on a third loading offset level determined from a second time varying loading offset level pattern corresponding to the first time slot can be broadcasted and a fourth loading factor based on a fourth loading offset level determined from the second time varying loading offset level pattern corresponding to the second time slot can be broadcasted. The third loading offset level and the fourth loading offset level can differ from each other by at least 0.5 dB. Moreover, a third mobile device can be scheduled for uplink transmission during the first time slot on a second channel based at least in part upon the channel quality reports and the third loading factor. The second channel can include a second frequency bandwidth. Further, a fourth mobile device can be scheduled for uplink transmission during the second time slot on the second channel based at least in part upon the channel quality reports and the fourth loading factor. For instance, a summation of the first loading offset level and the third loading offset level can be within 0.5 dB of a summation of the second loading offset level and the fourth loading offset level. Additionally, the first frequency bandwidth and the second frequency bandwidth can be non-overlapping. According to further examples, the first base station can include a disparate sector that utilizes a differing loading offset level pattern and/or a differing base station in the communication network can include a disparate sector that employs a differing loading offset level pattern.

Figure 18:
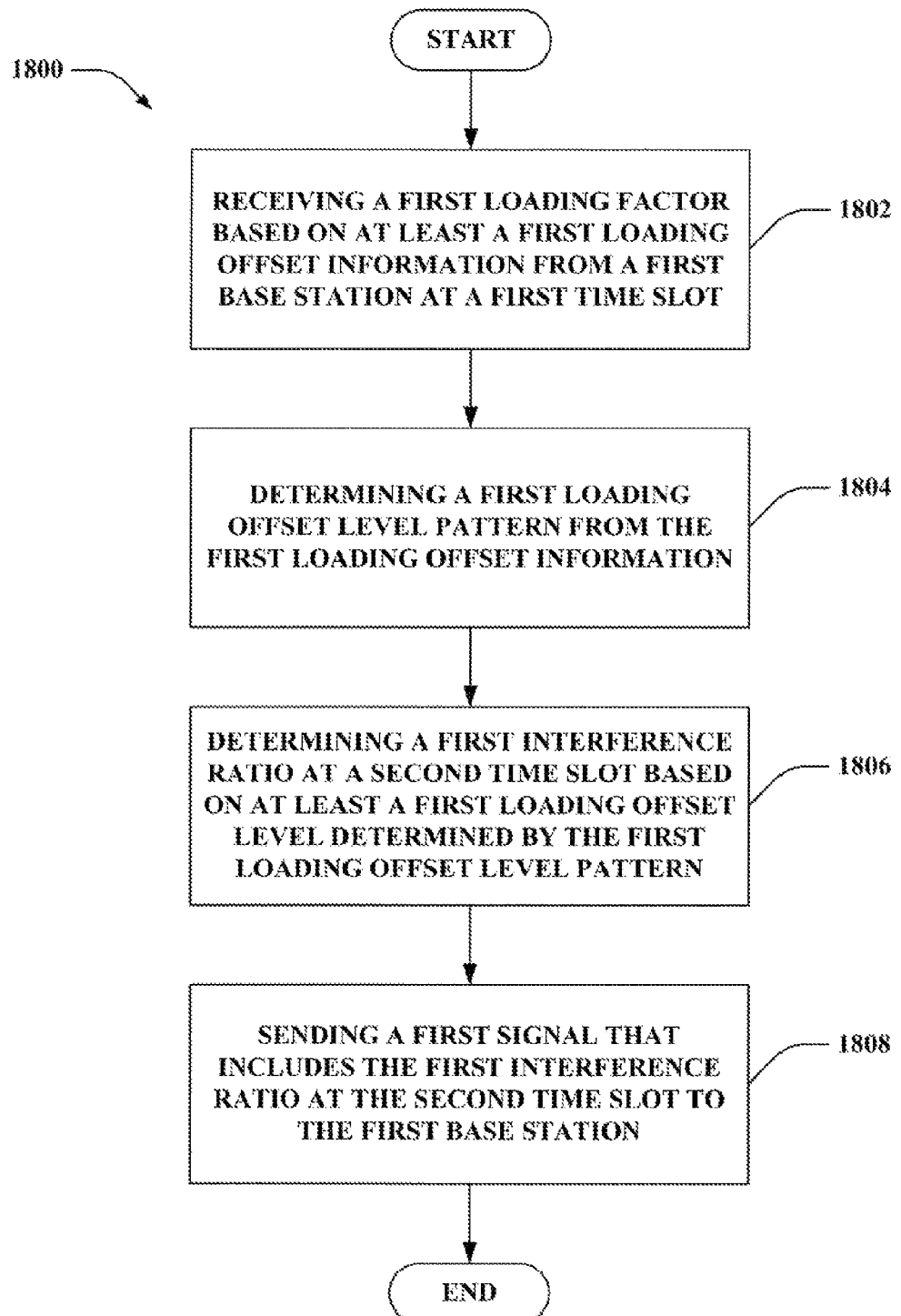
FIG. 18 is an illustration of an example methodology that facilitates operating a wireless mobile device in an environment that utilizes a dynamic loading offset level pattern.

With reference to FIG. 18, illustrated is a methodology that facilitates operating a wireless mobile device in an environment that utilizes a dynamic loading offset level pattern. At 1802, a first loading factor can be received based on at least a first loading offset information from a first base station at a first time slot. At 1804, a first loading offset level pattern can be determined from the first loading offset information. For example, the first loading offset level pattern can be deciphered by employing a lookup table, a predetermined function, and the like. At 1806, a first interference ratio can be determined at a second time slot based on at least a first loading offset level determined by the first loading offset level pattern. At 1808, a first signal that includes the first interference ratio can be sent at the second time slot to the first base station.

According to a further example, a second interference ratio can be determined at a third time slot based on at least a second loading offset level determined by the first loading offset level pattern. Further, a second signal that includes the second interference ratio can be sent at the third time slot to the base station. Moreover, the first loading offset level and the second loading offset level can differ by at least 0.5 dB.

Pursuant to a further illustration, a second loading factor that includes at least a second loading offset information can be received from a second base station at a fourth time slot. A second loading offset level pattern can be determined from the second loading offset information. The second loading offset level pattern can be generated by using a lookup table, a predetermined function, etc. Moreover, the first interference ratio can be determined based on at least the first loading offset level determined by the first loading offset level pattern and the second loading offset level determined by the second loading offset level pattern.

It will be appreciated that, in accordance with one or more aspects described herein, inferences can be made regarding uplink scheduling in a wireless communication network. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to identifying respective loads encountered by base station(s) and/or cell(s). In accordance with another example, loading information can be leveraged to infer how to adapt weighting pattern(s). It will be appreciated that the foregoing examples are illustrative in nature and are not intended to limit the number of inferences that can be made or the manner in which such inferences are made in conjunction with the various embodiments and/or methods described herein.

Figure 19:
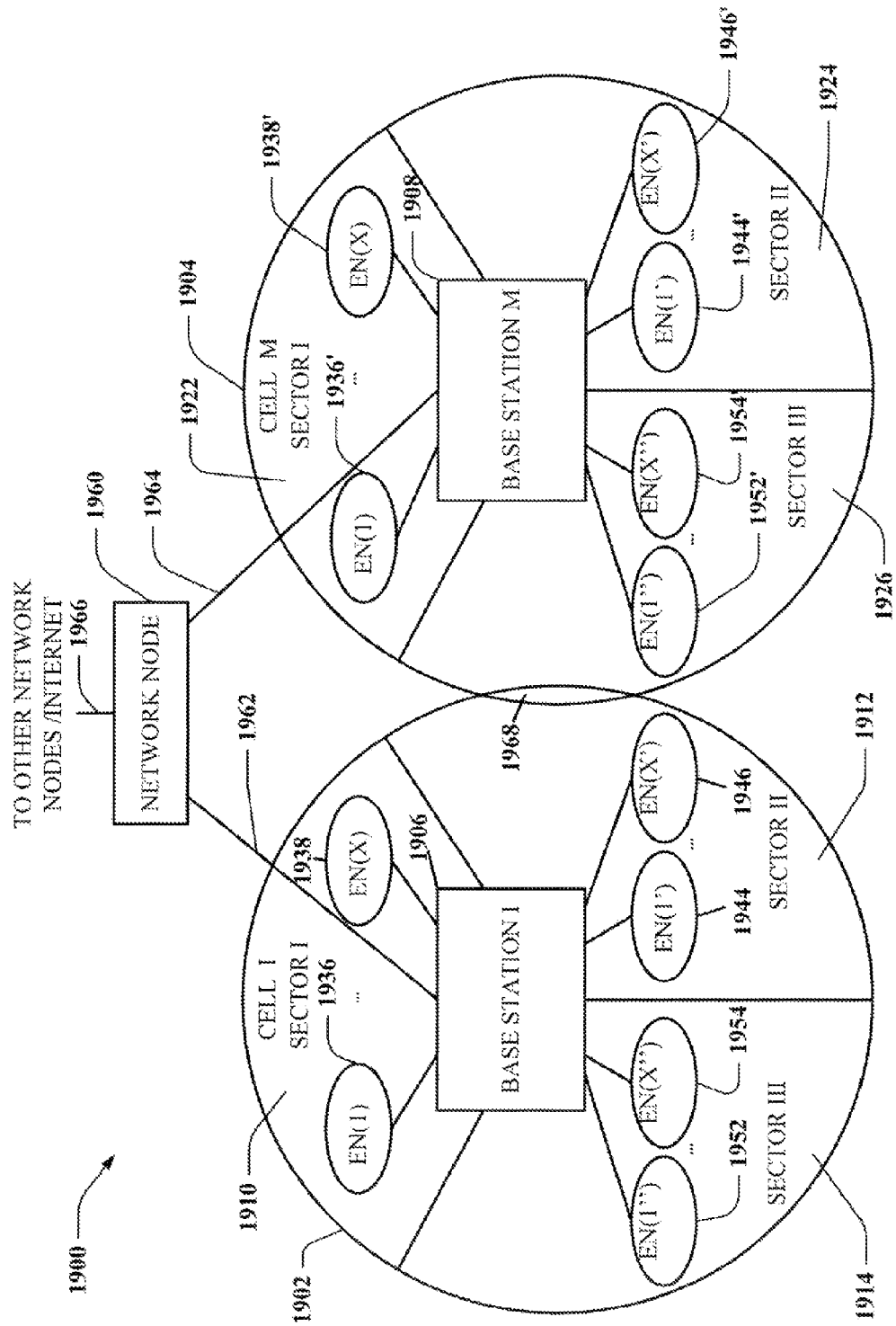
FIG. 19 is an illustration of an example communication system implemented in accordance with various aspects including multiple cells.

FIG. 19 depicts an example communication system 1900 implemented in accordance with various aspects including multiple cells: cell I 1902, cell M 1904. Note that neighboring cells 1902, 1904 overlap slightly, as indicated by cell boundary region 1968. Each cell 1902, 1904 of system 1900 includes three sectors. Cells which have not been subdivided into multiple sectors (N=1), cells with two sectors (N=2) and cells with more than 3 sectors (N>3) are also possible in accordance with various aspects. Cell 1902 includes a first sector, sector I 1910, a second sector, sector II 1912, and a third sector, sector III 1914. Each sector 1910, 1912, 1914 has two sector boundary regions; each boundary region is shared between two adjacent sectors.

Cell I 1902 includes a base station (BS), base station I 1906, and a plurality of end nodes (ENs) (e.g., wireless terminals) in each sector 1910, 1912, 1914. Sector I 1910 includes EN(1) 1936 and EN(X) 1938; sector II 1912 includes EN(1') 1944 and EN(X') 1946; sector III 1914 includes EN(1") 1952 and EN(X") 1954. Similarly, cell M 1904 includes base station M 1908, and a plurality of end nodes (ENs) in each sector 1922, 1924, 1926. Sector I 1922 includes EN(1) 1936' and EN(X) 1938'; sector II 1924 includes EN(1') 1944' and EN(X') 1946'; sector 3 1926 includes EN(") 1952' and EN(X") 1954'.

System 1900 also includes a network node 1960 which is coupled to BS I 1906 and BS M 1908 via network links 1962, 1964, respectively. Network node 1960 is also coupled to other network nodes, e.g., other base stations, AAA server nodes, intermediate nodes, routers, etc. and the Internet via network link 1966. Network links 1962, 1964, 1966 may be, e.g., fiber optic cables. Each end node, e.g., EN(1) 1936 may be a wireless terminal including a transmitter as well as a receiver. The wireless terminals, e.g., EN(1) 1936 may move through system 1900 and may communicate via wireless links with the base station in the cell in which the EN is currently located. The wireless terminals, (WTs), e.g., EN(1) 1936, may communicate with peer nodes, e.g., other WTs in system 1900 or outside system 1900 via a base station, e.g., BS 1906, and/or network node 1960. WTs, e.g., EN(1) 1936 may be mobile communications devices such as cell phones, personal data assistants with wireless modems, etc.

Figure 20:
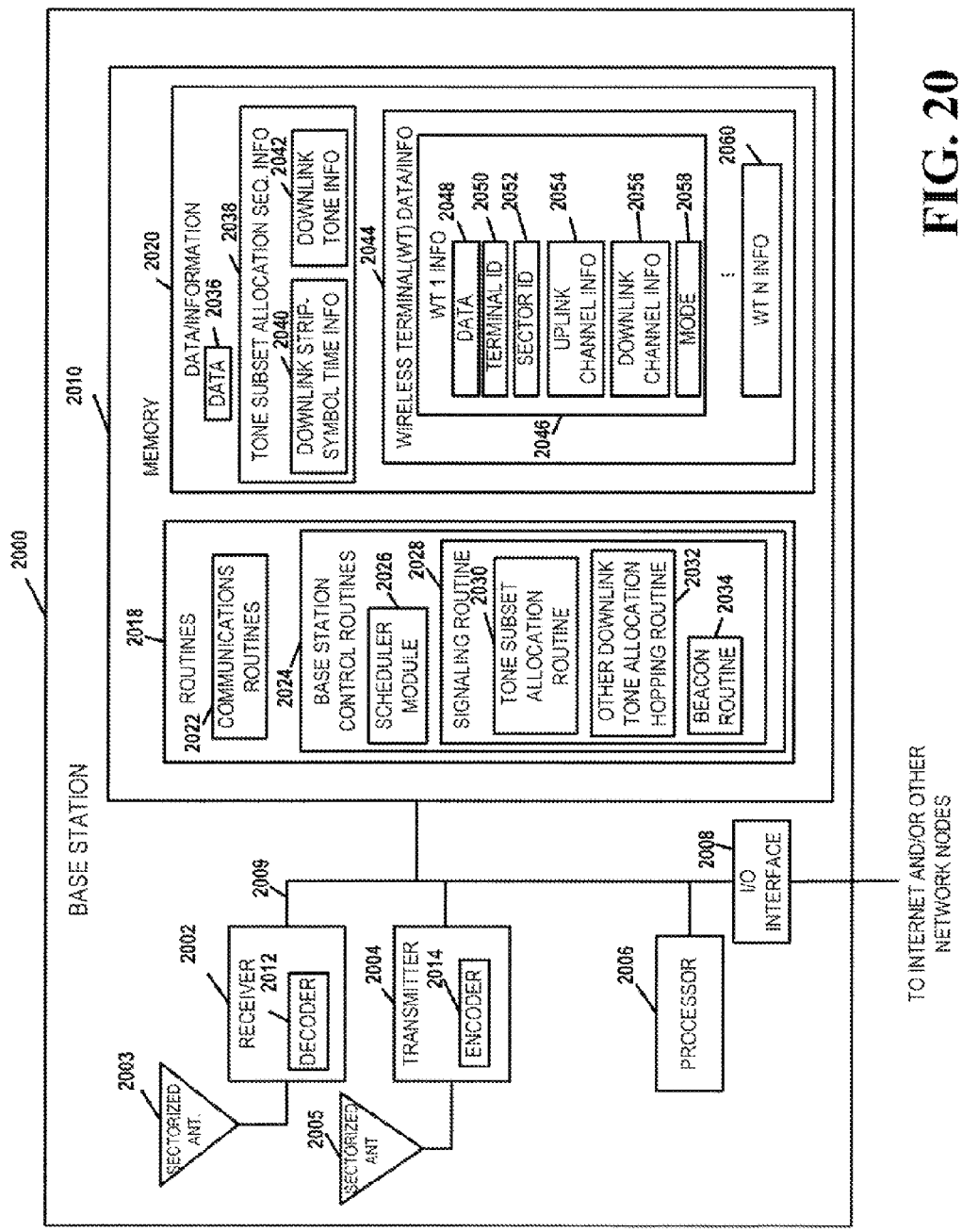
FIG. 20 is an illustration of an example base station in accordance with various aspects.

FIG. 20 illustrates an example base station 2000 in accordance with various aspects. Base station 2000 implements tone subset allocation sequences, with different tone subset allocation sequences generated for respective different sector types of the cell. Base station 2000 may be used as any one of base stations 1906, 1908 of the system 1900 of FIG. 19. The base station 2000 includes a receiver 2002, a transmitter 2004, a processor 2006, e.g., CPU, an input/output interface 2008 and memory 2010 coupled together by a bus 2009 over which various elements 2002, 2004, 2006, 2008, and 2010 may interchange data and information.

Sectorized antenna 2003 coupled to receiver 2002 is used for receiving data and other signals, e.g., channel reports, from wireless terminals transmissions from each sector within the base station's cell. Sectorized antenna 2005 coupled to transmitter 2004 is used for transmitting data and other signals, e.g., control signals, pilot signal, beacon signals, etc. to wireless terminals 2100 (see FIG. 21) within each sector of the base station's cell. In various aspects, base station 2000 may employ multiple receivers 2002 and multiple transmitters 2004, e.g., an individual receiver 2002 for each sector and an individual transmitter 2004 for each sector. Processor 2006, may be, e.g., a general purpose central processing unit (CPU). Processor 2006 controls operation of base station 2000 under direction of one or more routines 2018 stored in memory 2010 and implements the methods. I/O interface 2008 provides a connection to other network nodes, coupling the BS 2000 to other base stations, access routers, AAA server nodes, etc., other networks, and the Internet. Memory 2010 includes routines 2018 and data/information 2020.

Data/information 2020 includes data 2036, tone subset allocation sequence information 2038 including downlink strip-symbol time information 2040 and downlink tone information 2042, and wireless terminal (WT) data/info 2044 including a plurality of sets of WT information: WT 1 info 2046 and WT N info 2060. Each set of WT info, e.g., WT 1 info 2046 includes data 2048, terminal ID 2050, sector ID 2052, uplink channel information 2054, downlink channel information 2056, and mode information 2058.

Routines 2018 include communications routines 2022 and base station control routines 2024. Base station control routines 2024 includes a scheduler module 2026 and signaling routines 2028 including a tone subset allocation routine 2030 for strip-symbol periods, other downlink tone allocation hopping routine 2032 for the rest of symbol periods, e.g., non strip-symbol periods, and a beacon routine 2034.

Data 2036 includes data to be transmitted that will be sent to encoder 2014 of transmitter 2004 for encoding prior to transmission to WTs, and received data from WTs that has been processed through decoder 2012 of receiver 2002 following reception. Downlink strip-symbol time information 2040 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 2042 includes information including a carrier frequency assigned to the base station 2000, the number and frequency of tones, and the set of tone subsets to be allocated to the strip-symbol periods, and other cell and sector specific values such as slope, slope index and sector type.

Data 2048 may include data that WT1 2100 has received from a peer node, data that WT 1 2100 desires to be transmitted to a peer node, and downlink channel quality report feedback information. Terminal ID 2050 is a base station 2000 assigned ID that identifies WT 1 2100. Sector ID 2052 includes information identifying the sector in which WT1 2100 is operating. Sector ID 2052 can be used, for example, to determine the sector type. Uplink channel information 2054 includes information identifying channel segments that have been allocated by scheduler 2026 for WT1 2100 to use, e.g., uplink traffic channel segments for data, dedicated uplink control channels for requests, power control, timing control, etc. Each uplink channel assigned to WT1 2100 includes one or more logical tones, each logical tone following an uplink hopping sequence. Downlink channel information 2056 includes information identifying channel segments that have been allocated by scheduler 2026 to carry data and/or information to WT1 2100, e.g., downlink traffic channel segments for user data. Each downlink channel assigned to WT1 2100 includes one or more logical tones, each following a downlink hopping sequence. Mode information 2058 includes information identifying the state of operation of WT1 2100, e.g. sleep, hold, on.

Communications routines 2022 control the base station 2000 to perform various communications operations and implement various communications protocols. Base station control routines 2024 are used to control the base station 2000 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 2028 controls the operation of receiver 2002 with its decoder 2012 and transmitter 2004 with its encoder 2014. The signaling routine 2028 is responsible for controlling the generation of transmitted data 2036 and control information. Tone subset allocation routine 2030 constructs the tone subset to be used in a strip-symbol period using the method of the aspect and using data/information 2020 including downlink strip-symbol time info 2040 and sector ID 2052. The downlink tone subset allocation sequences will be different for each sector type in a cell and different for adjacent cells. The WTs 2100 receive the signals in the strip-symbol periods in accordance with the downlink tone subset allocation sequences; the base station 2000 uses the same downlink tone subset allocation sequences in order to generate the transmitted signals. Other downlink tone allocation hopping routine 2032 constructs downlink tone hopping sequences, using information including downlink tone information 2042, and downlink channel information 2056, for the symbol periods other than the strip-symbol periods. The downlink data tone hopping sequences are synchronized across the sectors of a cell. Beacon routine 2034 controls the transmission of a beacon signal, e.g., a signal of relatively high power signal concentrated on one or a few tones, which may be used for synchronization purposes, e.g., to synchronize the frame timing structure of the downlink signal and therefore the tone subset allocation sequence with respect to an ultra-slot boundary.

Figure 21:
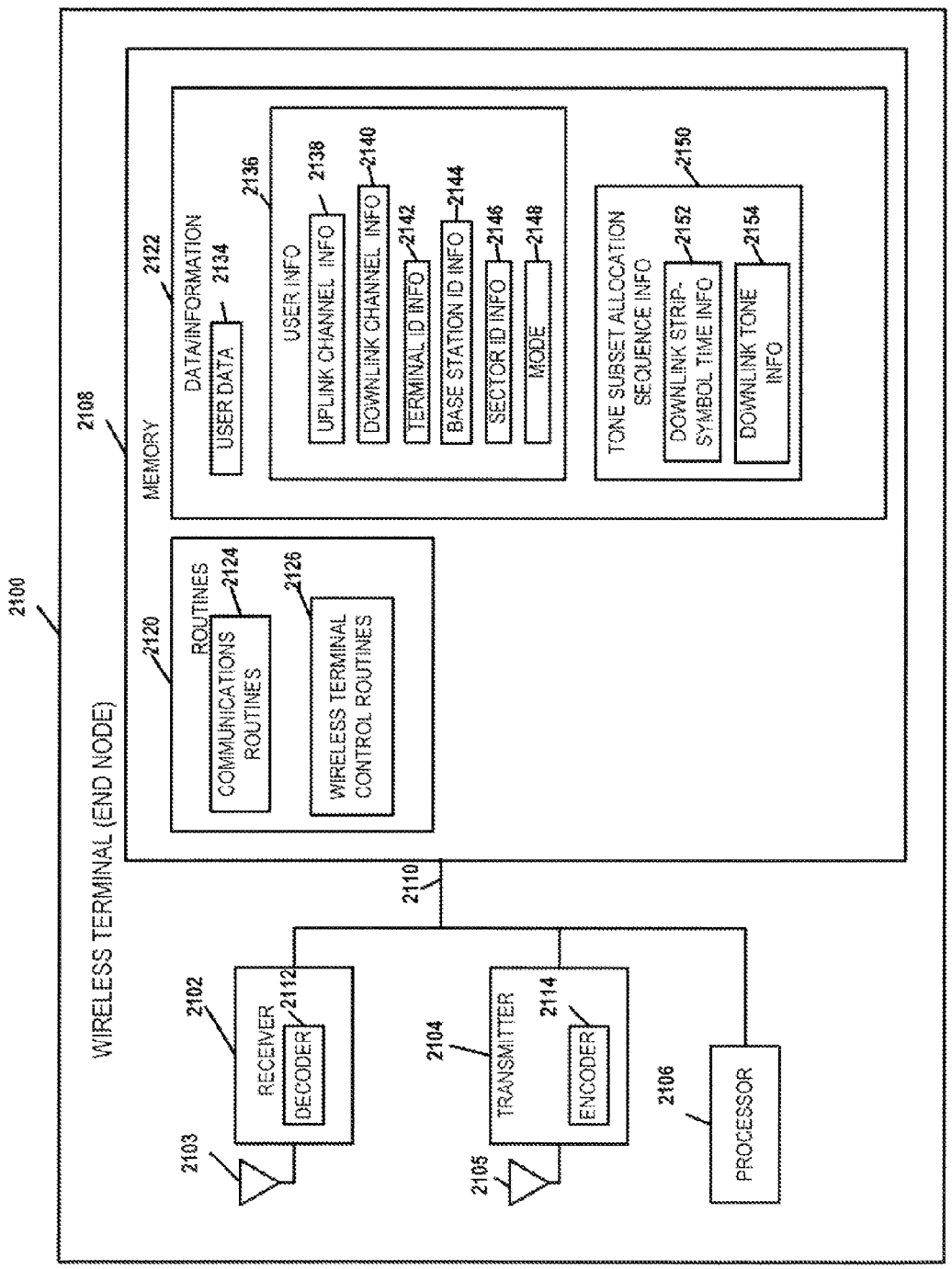
FIG. 21 is an illustration of an example wireless terminal (e.g., mobile device, end node, . . . ) implemented in accordance with various aspects described herein.

FIG. 21 illustrates an example wireless terminal (e.g., end node, mobile device, . . . ) 2100 which can be used as any one of the wireless terminals (e.g., end nodes, mobile devices, . . . ), e.g., EN(1) 1936, of the system 1900 shown in FIG. 19. Wireless terminal 2100 implements the tone subset allocation sequences. Wireless terminal 2100 includes a receiver 2102 including a decoder 2112, a transmitter 2104 including an encoder 2114, a processor 2106, and memory 2108 which are coupled together by a bus 2110 over which the various elements 2102, 2104, 2106, 2108 can interchange data and information. An antenna 2103 used for receiving signals from a base station 2000 (and/or a disparate wireless terminal) is coupled to receiver 2102. An antenna 2105 used for transmitting signals, e.g., to base station 2000 (and/or a disparate wireless terminal) is coupled to transmitter 2104.

The processor 2106 (e.g., a CPU) controls operation of wireless terminal 2100 and implements methods by executing routines 2120 and using data/information 2122 in memory 2108.

Data/information 2122 includes user data 2134, user information 2136, and tone subset allocation sequence information 2150. User data 2134 may include data, intended for a peer node, which will be routed to encoder 2114 for encoding prior to transmission by transmitter 2104 to base station 2000, and data received from the base station 2000 which has been processed by the decoder 2112 in receiver 2102. User information 2136 includes uplink channel information 2138, downlink channel information 2140, terminal ID information 2142, base station ID information 2144, sector ID information 2146, and mode information 2148. Uplink channel information 2138 includes information identifying uplink channels segments that have been assigned by base station 2000 for wireless terminal 2100 to use when transmitting to the base station 2000. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 2140 includes information identifying downlink channel segments that have been assigned by base station 2000 to WT 2100 for use when BS 2000 is transmitting data/information to WT 2100. Downlink channels may include downlink traffic channels and assignment channels, each downlink channel including one or more logical tone, each logical tone following a downlink hopping sequence, which is synchronized between each sector of the cell.

User info 2136 also includes terminal ID information 2142, which is a base station 2000 assigned identification, base station ID information 2144 which identifies the specific base station 2000 that WT has established communications with, and sector ID info 2146 which identifies the specific sector of the cell where WT 2000 is presently located. Base station ID 2144 provides a cell slope value and sector ID info 2146 provides a sector index type; the cell slope value and sector index type may be used to derive tone hopping sequences. Mode information 2148 also included in user info 2136 identifies whether the WT 2100 is in sleep mode, hold mode, or on mode.

Tone subset allocation sequence information 2150 includes downlink strip-symbol time information 2152 and downlink tone information 2154. Downlink strip-symbol time information 2152 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 2154 includes information including a carrier frequency assigned to the base station 2000, the number and frequency of tones, and the set of tone subsets to be allocated to the strip-symbol periods, and other cell and sector specific values such as slope, slope index and sector type.

Routines 2120 include communications routines 2124 and wireless terminal control routines 2126. Communications routines 2124 control the various communications protocols used by WT 2100. For example, communications routines 2124 may enable communicating via a wide area network (e.g., with base station 2000) and/or a local area peer-to-peer network (e.g., directly with disparate wireless terminal(s)). By way of further example, communications routines 2124 may enable receiving a broadcast signal (e.g., from base station 2000). Wireless terminal control routines 2126 control basic wireless terminal 2100 functionality including the control of the receiver 2102 and transmitter 2104.

Figure 22:
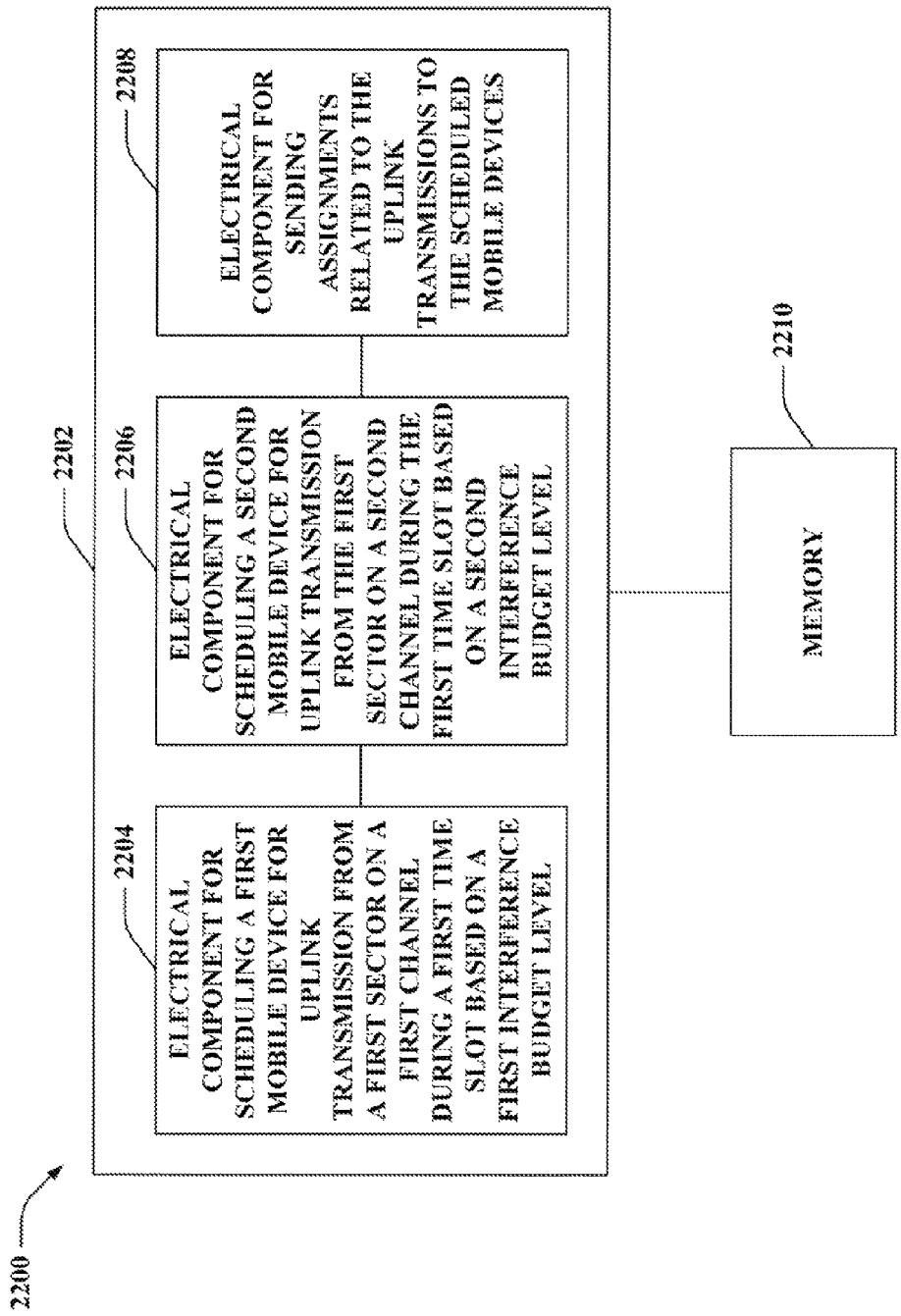
FIG. 22 is an illustration of an example system that enables scheduling uplink transmissions by utilizing a static interference budget in a multi-carrier environment.

With reference to FIG. 22, illustrated is a system 2200 that enables scheduling uplink transmissions by utilizing a static interference budget in a multi-carrier environment. For example, system 2200 can reside at least partially within a base station. It is to be appreciated that system 2200 is represented as including functional blocks, which can be functional blocks that represent functions implemented by a processor, software, or combination thereof (e.g., firmware). System 2200 includes a logical grouping 2202 of electrical components that can act in conjunction. For instance, logical grouping 2202 can include an electrical component for scheduling a first mobile device for uplink transmission from a first sector on a first channel during a first time slot based on a first interference budget level 2204. Further, logical grouping 2202 can comprise an electrical component for scheduling a second mobile device for uplink transmission from the first sector on a second channel during the first time slot based on a second interference budget level 2206. Moreover, logical grouping 2202 can include an electrical component for sending assignments related to the uplink transmissions to the scheduled mobile devices 2208. Additionally, system 2200 can include a memory 2210 that retains instructions for executing functions associated with electrical components 2204, 2206, and 2208. While shown as being external to memory 2210, it is to be understood that one or more of electrical components 2204, 2206, and 2208 can exist within memory 2210.

Figure 23:
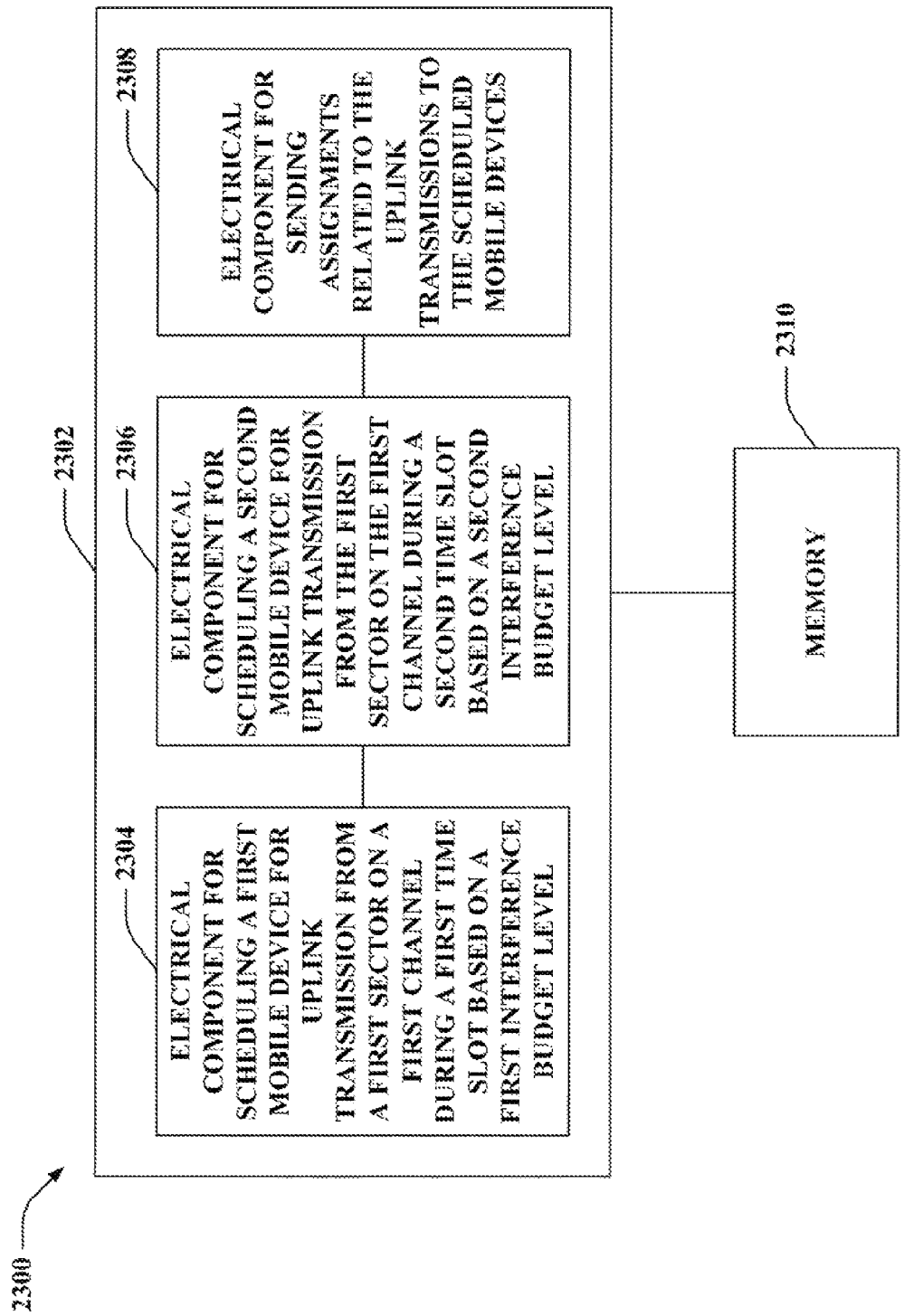
FIG. 23 is an illustration of an example system that enables scheduling uplink transmissions by utilizing a dynamic interference budget.

Turning to FIG. 23, illustrated is a system 2300 that enables scheduling uplink transmissions by utilizing a dynamic interference budget. System 2300 can reside at least partially within a base station. It is to be appreciated that system 2300 is represented as including functional blocks, which can be functional blocks that represent functions implemented by a processor, software, or combination thereof (e.g., firmware). System 2300 includes a logical grouping 2302 of electrical components that can act in conjunction. For instance, logical grouping 2302 can include an electrical component for scheduling a first mobile device for uplink transmission from a first sector on a first channel during a first time slot based on a first interference budget level 2304. Moreover, logical grouping 2302 can include an electrical component for scheduling a second mobile device for uplink transmission from the first sector on the first channel during a second time slot based on a second interference budget level 2306. Further, logical grouping 2302 can comprise an electrical component for sending assignments related to the uplink transmissions to the scheduled mobile devices 2308. Additionally, system 2300 can include a memory 2310 that retains instructions for executing functions associated with electrical components 2304, 2306, and 2308. While shown as being external to memory 2310, it is to be understood that one or more of electrical components 2304, 2306, and 2308 can exist within memory 2310.

Figure 24:
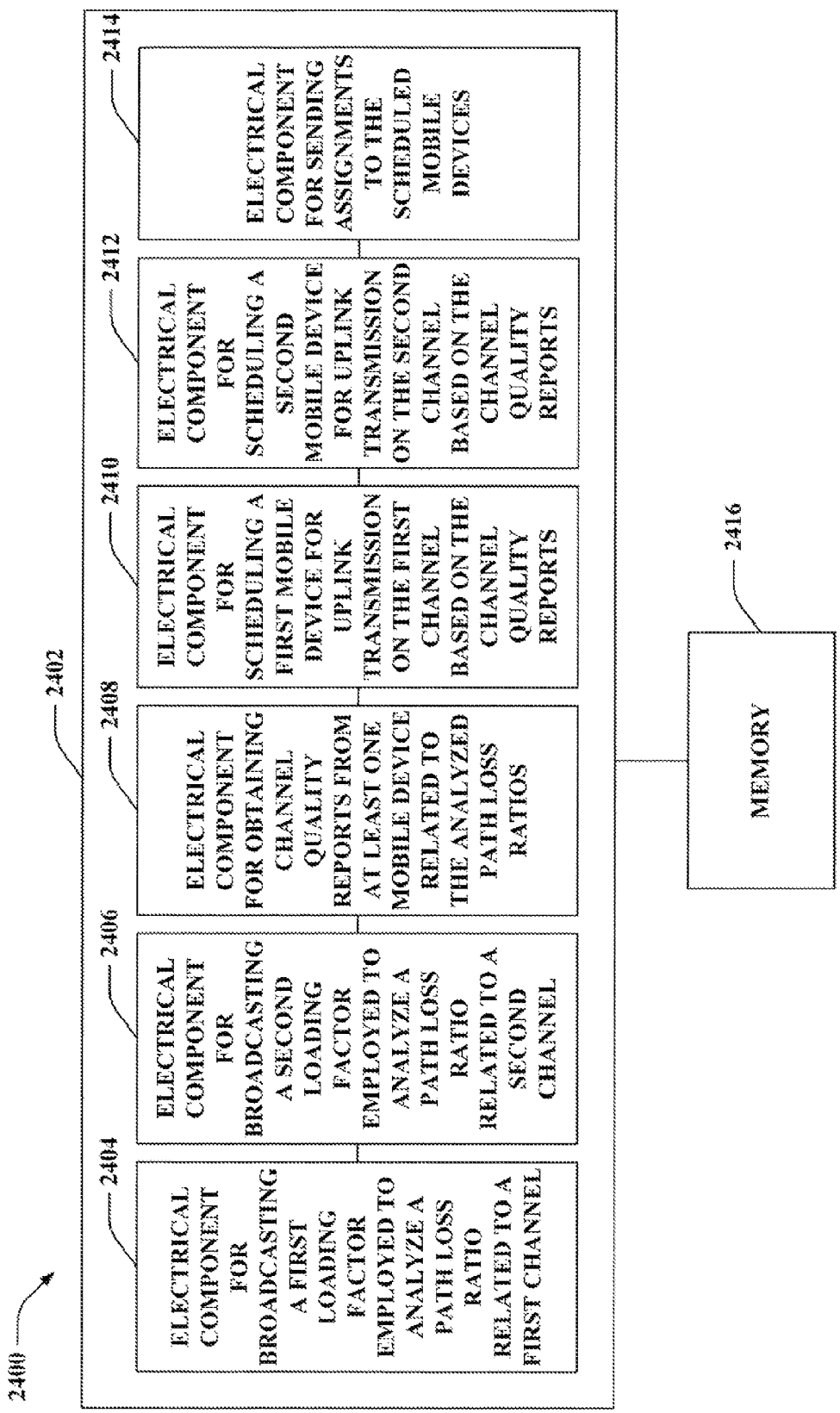
FIG. 24 is an illustration of an example system that enables scheduling uplink transmissions by utilizing a static loading offset level.

With reference to FIG. 24, illustrated is a system 2400 that enables scheduling uplink transmissions by utilizing a static loading offset level. For example, system 2400 can reside at least partially within a base station. It is to be appreciated that system 2400 is represented as including functional blocks, which can be functional blocks that represent functions implemented by a processor, software, or combination thereof (e.g., firmware). System 2400 includes a logical grouping 2402 of electrical components that can act in conjunction. For instance, logical grouping 2402 can include an electrical component for broadcasting a first loading factor employed to analyze a path loss ratio related to a first channel 2404. For instance, the first loading factor can be based on at least a first loading offset level. Further, logical grouping 2402 can comprise an electrical component for broadcasting a second loading factor employed to analyze a path loss ratio related to a second channel 2406. The second loading factor, for example, can be based on at least a second loading offset level. Moreover, logical grouping 2402 can include an electrical component for obtaining channel quality reports from at least one mobile device related to the analyzed path loss ratios 2408. Logical grouping 2402 can further include an electrical component for scheduling a first mobile device for uplink transmission on the first channel based on the channel quality reports 2410. Logical grouping 2402 can also include an electrical component for scheduling a second mobile device for uplink transmission on the second channel based on the channel quality reports 2412. Moreover, logical grouping 2402 can comprise an electrical component for sending assignments to the scheduled mobile devices 2414. Additionally, system 2400 can include a memory 2416 that retains instructions for executing functions associated with electrical components 2404, 2406, 2408, 2410, 2412, and 2414. While shown as being external to memory 2416, it is to be understood that one or more of electrical components 2404, 2406, 2408, 2410, 2412, and 2414 can exist within memory 2416.

Figure 25:
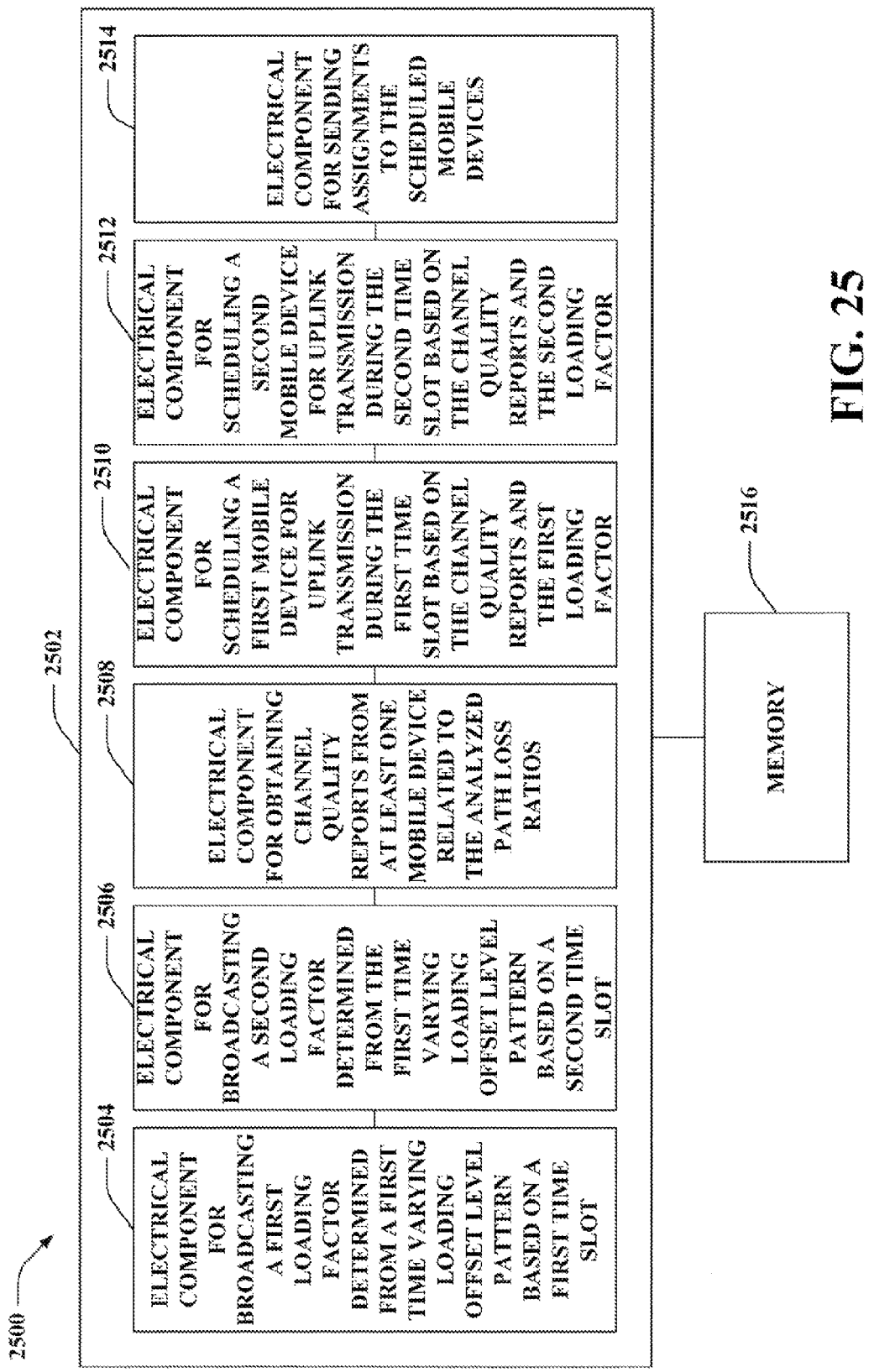
FIG. 25 is an illustration of an example system that enables scheduling uplink transmissions by utilizing a dynamic loading offset level pattern.

With reference to FIG. 25, illustrated is a system 2500 that enables scheduling uplink transmissions by utilizing a dynamic loading offset level pattern. For example, system 2500 can reside at least partially within a base station. It is to be appreciated that system 2500 is represented as including functional blocks, which can be functional blocks that represent functions implemented by a processor, software, or combination thereof (e.g., firmware). System 2500 includes a logical grouping 2502 of electrical components that can act in conjunction. For instance, logical grouping 2502 can include an electrical component for broadcasting a first loading factor determined from a first time varying loading offset level pattern based on a first time slot 2504. For instance, the first loading factor can be based on a first loading offset level. Further, logical grouping 2502 can comprise an electrical component for broadcasting a second loading factor determined from the first time varying loading offset level pattern based on a second time slot 2506. The second loading factor, for example, can be based on a second loading offset level. Moreover, logical grouping 2502 can include an electrical component for obtaining channel quality reports from at least one mobile device related to the analyzed path loss ratios 2508. Logical grouping 2502 can further include an electrical component for scheduling a first mobile device for uplink transmission during the first time slot based on the channel quality reports and the first loading factor 2510. Logical grouping 2502 can also include an electrical component for scheduling a second mobile device for uplink transmission during the second time slot based on the channel quality reports and the second loading factor 2512. Moreover, logical grouping 2502 can comprise an electrical component for sending assignments to the scheduled mobile devices 2514. Additionally, system 2500 can include a memory 2516 that retains instructions for executing functions associated with electrical components 2504, 2506, 2508, 2510, 2512, and 2514. While shown as being external to memory 2516, it is to be understood that one or more of electrical components 2504, 2506, 2508, 2510, 2512, and 2514 can exist within memory 2516.

Figure 26:
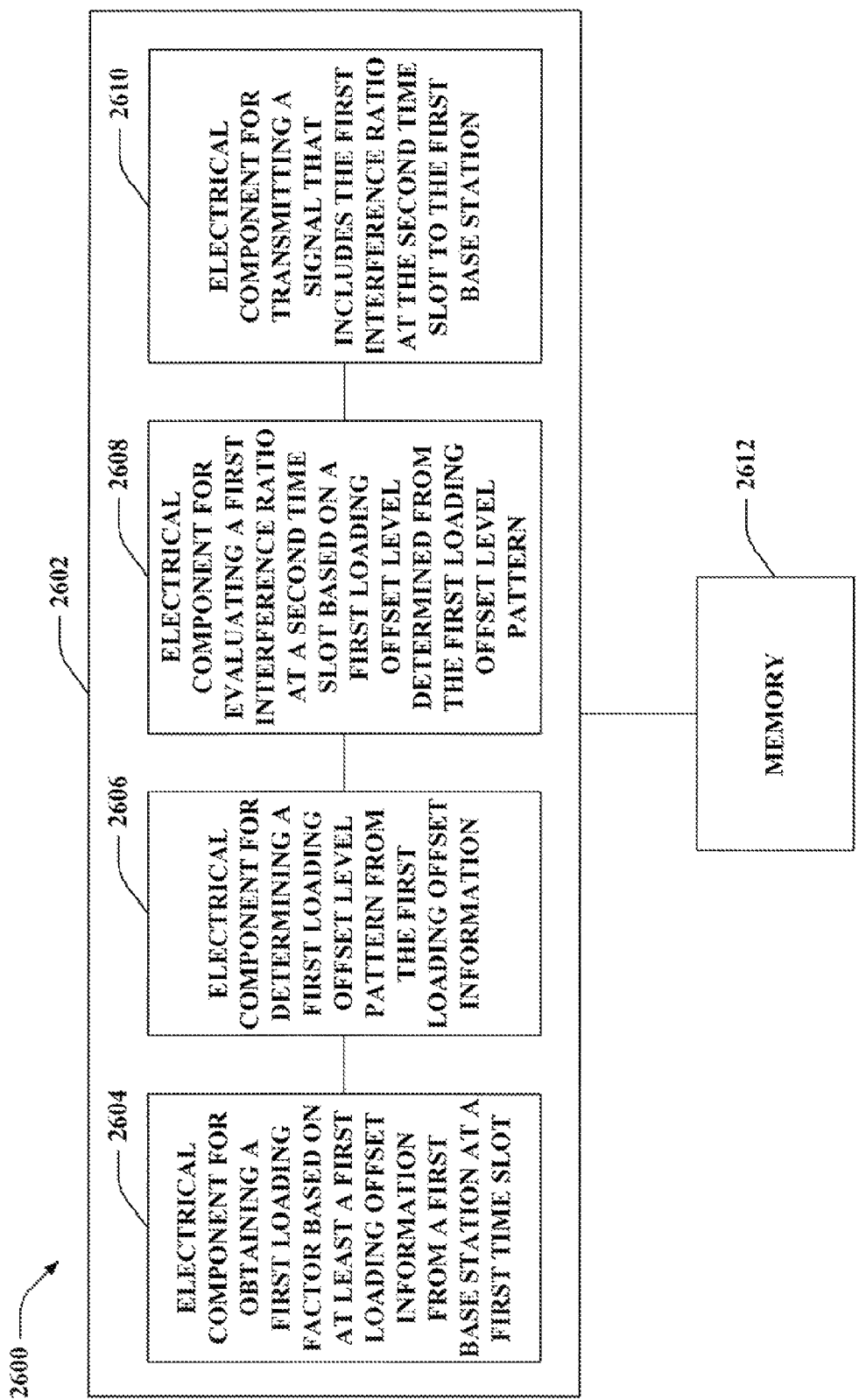
FIG. 26 is an illustration of an example system that enables evaluating an interference ratio based upon a dynamic loading offset level pattern.

Turning to FIG. 26, illustrated is a system 2600 that enables evaluating an interference ratio based upon a dynamic loading offset level pattern. System 2600 can reside at least partially within a mobile device. It is to be appreciated that system 2600 is represented as including functional blocks, which can be functional blocks that represent functions implemented by a processor, software, or combination thereof (e.g., firmware). System 2600 includes a logical grouping 2602 of electrical components that can act in conjunction. For instance, logical grouping 2602 can include an electrical component for obtaining a first loading factor based on at least a first loading offset information from a first base station at a first time slot 2604. Moreover, logical grouping 2602 can include an electrical component for determining a first loading offset level pattern from the first loading offset information 2606. Further, logical grouping 2602 can comprise an electrical component for evaluating a first interference ratio at a second time slot based on a first loading offset level determined from the first loading offset level pattern 2608. Logical grouping 2602 can also include an electrical component for transmitting a signal that includes the first interference ratio at the second time slot to the first base station 2610. Additionally, system 2600 can include a memory 2612 that retains instructions for executing functions associated with electrical components 2604, 2606, 2608, and 2610. While shown as being external to memory 2612, it is to be understood that one or more of electrical components 2604, 2606, 2608, and 2610 can exist within memory 2612.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates scheduling uplink transmissions in a communication network including a first base station that includes a first sector utilizing multiple interference budget levels, comprising:
receiving channel quality reports from one or more mobile device;
selecting a first mobile device for uplink transmission from a first sector on a first channel during a first time slot based on a first interference budget level, the first channel including a first frequency bandwidth;
selecting a second mobile device for uplink transmission from the first sector on a second channel during the first time slot based on a second interference budget level, the second channel including a second frequency bandwidth and the first and second interference budget levels differing by at least 0.5 dB; and transmitting assignments to the first and second mobile devices, said assignments being related to scheduled uplink transmissions.

2. The method of claim 1,
wherein the first frequency bandwidth and the second frequency bandwidth are non-overlapping; and
wherein the first interference budget sets forth a total interference level not to be exceeded by the first mobile device when using the first channel during the first time slot.

3. The method of claim 1,
wherein said selecting a first mobile device is performed as part of a scheduling operation;
wherein a transmitted assignment includes information pertaining to a maximum interference budget assigned to a corresponding mobile device for an uplink transmission.

4. The method of claim 1, wherein the channel quality reports include a measurement of an interference ratio between a signal strength from the serving first base station to a respective mobile device and a weighted sum of signal strengths from interfering base stations.

5. The method of claim 4, wherein a sum interference emitted from selected mobile devices upon each channel in the first sector of the first base station at the first time slot is limited to the respective interference budget levels.

6. The method of claim 1, wherein the first base station further includes a second sector, the method further comprising:
selecting a third mobile device for uplink transmission from the second sector on a third channel during the first time slot based on a third interference budget level, the third channel including a third frequency bandwidth; and
selecting a fourth mobile device for uplink transmission from the second sector on a fourth channel during the first time slot based on a fourth interference budget level, the fourth channel including a fourth frequency bandwidth and the third and fourth interference budget levels are at least 0.5 dB different from each other.

7. The method of claim 6, wherein the first frequency bandwidth and the third frequency bandwidth have at least 50% in common, and the second frequency bandwidth and the fourth frequency bandwidth have at least 50% in common.

8. The method of claim 7, wherein the first interference budget level is greater than the third interference budget level, and the second interference budget level is less than the fourth interference budget level.

9. The method of claim 1, wherein the communication network further includes a second base station that includes a third sector, the method further comprising:
selecting a fifth mobile device for uplink transmission from the third sector on a fifth channel during the first time slot based on a fifth interference budget level, the fifth channel includes a fifth frequency bandwidth;
selecting a sixth mobile device for uplink transmission from the third sector on a sixth channel during the first time slot based on a sixth interference budget level, the sixth channel includes a sixth frequency bandwidth and the fifth and sixth interference budget levels differ by at least 0.5 dB; and
transmitting assignments to the fifth and sixth mobile devices related to scheduled uplink transmissions.

10. The method of claim 9, wherein the first frequency bandwidth and the fifth frequency bandwidth have at least 50% in common, and the second frequency bandwidth and the sixth frequency bandwidth have at least 50% in common.

11. The method of claim 10, wherein the first interference budget level is greater than the fifth interference budget level, and the second interference budget level is less than the sixth interference budget level.

12. A wireless communications apparatus, comprising:
a memory that retains instructions related to selecting a first mobile device for uplink transmission from a first sector on a first channel during a first time slot based on a first interference budget level, selecting a second mobile device for uplink transmission from the first sector on a second channel during the first time slot based on a second interference budget level, and transmitting assignments to the first and second mobile devices, said assignments being related to scheduled uplink transmissions, the first channel including a first frequency bandwidth, the second channel including a second frequency bandwidth that is non-overlapping with the first frequency bandwidth, and the first and second interference budget levels differing by at least 0.5 dB; and
a processor, coupled to the memory, configured to execute the instructions retained in the memory.

13. The wireless communications apparatus of claim 12, wherein the memory further retains instructions related to obtaining channel quality reports from one or more mobile device, the channel quality reports including a measurement of an interference ratio between a signal strength from a serving base station to a respective mobile device and a weighted sum of signal strengths from interfering base stations; and
wherein the first interference budget sets forth a total interference level not to be exceeded by the first mobile device when using the first channel during the first time slot.

14. The wireless communications apparatus of claim 12, wherein a transmitted assignment includes information pertaining to a maximum interference budget assigned to a corresponding mobile device for an uplink transmission.

15. The wireless communications apparatus of claim 12, wherein the memory further retains instructions related to selecting a third mobile device for uplink transmission from a second sector on a third channel during the first time slot based on a third interference budget level and selecting a fourth mobile device for uplink transmission from the second sector on a fourth channel during the first time slot based on a fourth interference budget level, the third channel including a third frequency bandwidth, the fourth channel including a fourth frequency bandwidth, and the third and fourth interference budget levels differing by at least 0.5 dB from each other.

16. The wireless communications apparatus of claim 15, wherein a first wireless communications base station includes the first sector and the second sector.

17. The wireless communications apparatus of claim 15, wherein a first wireless communications base station includes the first sector and a second wireless communication base station includes the second sector.

18. The wireless communications apparatus of claim 15, wherein the first frequency bandwidth and the third frequency bandwidth have at least 50% in common, and the second frequency bandwidth and the fourth frequency bandwidth have at least 50% in common.

19. A wireless communications apparatus that enables scheduling uplink transmissions by utilizing multiple interference budget levels, comprising:
- means for selecting a first mobile device for uplink transmission from a first sector on a first channel during a first time slot based on a first interference budget level;
- means for selecting a second mobile device for uplink transmission from the first sector on a second channel during the first time slot based on a second interference budget level, the first and second interference budget levels differing by at least 0.5 dB; and
- means for transmitting assignments related to the uplink transmissions to the first and second mobile devices.

20. The wireless communications apparatus of claim 19, further comprising means for obtaining channel quality reports from at least one mobile device, the channel quality reports include a measurement of an interference ratio between a signal strength from a serving base station to a respective mobile device and a weighted sum of signal strengths from interfering base stations.

21. The wireless communications apparatus of claim 19, further comprising:
- means for selecting a third mobile device for uplink transmission from a second sector on a third channel during the first time slot based on a third interference budget level; and
- means for selecting a fourth mobile device for uplink transmission from the second sector on a fourth channel during the first time slot based on a fourth interference budget level.

22. A non-transitory machine-readable medium having stored thereon machine-executable instructions for:
- selecting a first mobile device for uplink transmission from a first sector on a first channel during a first time slot based on a first interference budget level, the first channel includes a first frequency bandwidth; and
- selecting a second mobile device for uplink transmission from the first sector on a second channel during the first time slot based on a second interference budget level, the second channel includes a second frequency bandwidth that is non-overlapping with the first frequency bandwidth and the first and second interference budget levels differing by at least 0.5 dB.

23. The non-transitory machine-readable medium of claim 22, the machine-executable instructions further comprise instructions for receiving channel quality reports from at least one mobile device, the channel quality reports include a measurement of an interference ratio between a signal strength from a serving base station to a respective mobile device and a weighted sum of signal strengths from interfering base stations.

24. The non-transitory machine-readable medium of claim 22, the machine-executable instructions further comprise instructions for:
- selecting a third mobile device for uplink transmission from a second sector on a third channel during the first time slot based on a third interference budget level, the third channel including a third frequency bandwidth; and
- selecting a fourth mobile device for uplink transmission from the second sector on a fourth channel during the first time slot based on a fourth interference budget level, the fourth channel includes a fourth frequency bandwidth that lacks overlap with the third frequency bandwidth and the third and fourth interference budget levels differ by at least 0.5 dB from each other.

25. In a wireless communications system, an apparatus comprising:
- a processor configured to:
  - select a first mobile device for uplink transmission from a first sector on a first channel during a first time slot based on a first interference budget level, the first channel including a first frequency bandwidth; and
  - select a second mobile device for uplink transmission from the first sector on a second channel during the first time slot based on a second interference budget level, the second channel including a second frequency bandwidth that is non-overlapping with the first frequency bandwidth and the first and second interference budget levels differ by at least 0.5 dB; and
- a memory coupled to said processor.

* * * * *